(12) United States Patent
Ghosh et al.

(10) Patent No.: US 12,744,405 B2
(45) Date of Patent: Sep. 22, 2026

(54) BUS INERTIA FOR ENHANCING DYNAMIC FLEXIBILITY OF HYBRID POWER SYSTEMS

(71) Applicant: Khalifa University of Science and Technology, Abu Dhabi (AE)

(72) Inventors: Sudipta Ghosh, Abu Dhabi (AE); Mohamed Shawky El Moursi, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 478 days.

(21) Appl. No.: 18/455,296

(22) Filed: Aug. 24, 2023

(65) Prior Publication Data

US 2024/0072570 A1 Feb. 29, 2024

Related U.S. Application Data

(60) Provisional application No. 63/402,012, filed on Aug. 29, 2022.

(51) Int. Cl.

*H02J 13/12* (2026.01)
*H02J 3/38* (2026.01)
*H02J 101/20* (2026.01)
*H02J 103/30* (2026.01)

(52) U.S. Cl.

CPC .............. *H02J 13/12* (2026.01); *H02J 3/381* (2013.01); *H02J 2101/20* (2026.01); *H02J 2103/30* (2026.01)

(58) Field of Classification Search

None

See application file for complete search history.

(56) References Cited

FOREIGN PATENT DOCUMENTS

CN 108695862 B * 6/2021 ............ H02J 3/0014

OTHER PUBLICATIONS

English Translation of CN-108695862-B (Year: 2021).*

* cited by examiner

*Primary Examiner* — Ryan A Jarrett

(74) *Attorney, Agent, or Firm* — Kilpatrick Townsend & Stockton LLP

(57) ABSTRACT

The integration of renewable energy resources and employment of multi-terminal dc links have dramatically transformed the structure of traditional power systems into hybrid networks with reduced inertia levels. A novel approach is proposed for determining bus inertia that captures power system dynamics and facilitates the real-time computation of grid flexibility. The bus inertia is defined as the distribution of the total inertia across all of the system buses, located in different geographical regions. The computation of bus inertia can use augmented admittance matrix, bus voltages, line parameters, inertia constants, and internal voltage set-points of synchronous machines. The determination of bus inertia can be used during planning and operation phases that span long and short-time horizons to enhance system flexibility.

20 Claims, 23 Drawing Sheets

BUS INERTIA FOR ENHANCING DYNAMIC FLEXIBILITY OF HYBRID POWER SYSTEMS

CROSS-REFERENCE TO RELATED APPLICATION

This application claims priority to U.S. Provisional Patent Application No. 63/402,012, filed on Aug. 29, 2022, entitled "BUS INERTIA FOR ENHANCING DYNAMIC FLEXIBILITY OF HYBRID POWER SYSTEMS" which is hereby incorporated by reference in its entirety.

BACKGROUND OF THE INVENTION

As a result of the integration of renewable energy resources and the use of multi-terminal dc links, structures of traditional power networks have been transformed into hybrid networks with low inertia levels. Therefore, a new coherent architecture may be necessary for computing spatiotemporal distributions of total system inertia to measure dynamic flexibility in power grids.

The employment of inverter-based renewable energy resources (RES) changes the operational paradigm and dynamic characteristics of traditional electrical networks. For example, replacing conventional synchronous generators with high penetration of RES significantly reduces the total system inertia. As a result, power systems will more likely experience larger frequency excursions, voltage instability and the presence of poorly damped inter-area modes that are associated with the occurrence of small disturbances. These oscillations are more prominent due to the stochastic nature of RES and its dependence on weather conditions. Furthermore, the intermittent RES combined with fluctuations from the demand side result in a net-load profile of high volatility. As a result, maintaining balance between generation and demand represents an important challenge to system operators. In addition, RES interconnections with weak buses adversely contribute to these oscillations, making power grids more susceptible to cascading failures if proper control actions are not taken on time. To resolve these issues, the strength of point of common coupling (PCC) needs to be assessed before connecting bulk RES to ensure stable and flexible operation during normal and disturbed operating conditions. Consequently, several studies have been conducted in the literature to provide new perspectives and resolutions for power system flexibility with high penetration levels of RES. The flexibility refers to the ability of a grid to cope with the intermittent RES by modulating the feed-in and/or feed-out of power over different time horizons. In general, system flexibility is obtained via increased reserves, construction of transmission lines, or by different operational procedures, which include unit commitment planning, scheduling, installing additional storage devices, electric vehicles, demand-side management, and through RES integration studies. For additional flexibility, a Monte Carlo chronological simulation has been proposed and reserve, ramp rate and ramp constraint have been employed. Although previous conducted studies are relevant to increasing RES integration, they have been conducted based on steady-state analysis. Comparatively, the bus inertia assessment method considers the dynamic aspect of the system, where the dynamic stability is correlated with the flexibility of the grid. The dynamic grid flexibility has been considered previously by other groups. However, previous methods have required rigorous calculation of multiple sensitivity analysis, which defines an individual machine's sensitivity with changing bus injections. As a result, the overall process of using previous methods becomes highly complex for changing bus injections from RES. Furthermore, a flexibility expression included in previous methods can require more additional data like load flow, Jacobian and its inverse, location for power smoothing devices which may lead to numerical instability issues, especially at stressed conditions. Finally, the accuracy of the results from previous methods can be highly dependent on the perturbation level and location, and thus can make the results less reliable. Additionally, sensitivity-based dynamic load modelling methods have been previously implemented. The sensitivity of damping is calculated concerning the parameters of the dynamic load model to identify the best point of interconnections. The results are obtained based on residue and sensitivity analysis using the linearized system model. However, the methods may be strictly valid for small parameter variations and may not be used for more detailed investigations. Furthermore, the methods can be computationally expensive and not generally suited for large systems.

Dynamic flexibility can be closely related to overall stability of a power grid and thus can be directly connected with an estimation of overall grid inertia or center of inertia (COI). However, deregulation, restructuring of power systems, introduction of nonlinear loads, and replacement of conventional bulk generators with RES may have made the statement obsolete. Generator inertias can be confined at some points in the grid, whereas bus inertias can be more distributed. Hence, there can be a comparatively strong bonding between bus inertias and grid dynamic flexibility in analyzing the impact of the variable nature of RES on existing grid stability.

Attempts have been made to compute an inertia index among all buses. For example, the inertia distribution index has been found by integrating the difference between a frequency at a specific bus and a COI frequency over a given period. An inertia distribution has been mapped based on these values, and the lowest rank can indicate close proximity to a COI. However, implementation of this integration method for a large system can necessitate a frequency availability at each bus, which can be highly expensive. Further, the inertia distribution map may change with varying fault locations. Therefore, the integration method may not be generic and may be impractical to apply for a large-system. Alternatively, a sensitivity-based approach has been proposed for calculating an inertia distribution index and COI location. Under the sensitivity approach, an inertial index at a bus can be computed using a sensitivity matrix of bus voltage phase angle against changes in system states. In addition, the sensitivity method uses a generator classical model. As a result, the sensitivity method may only be valid under small changes in the operating conditions and can be computationally expensive. Moreover, developing the small-signal model associated with the sensitivity method can be a cumbersome process for a large network, and the results using a classical generator model may be erroneous and impractical. Aside from these, the sensitivity method is offline based, and thus load modelling may not be possible.

BRIEF SUMMARY OF THE INVENTION

Many advantages of the bus inertia assessment method according to embodiments of the present disclosure include at the least the following. 1) The proposed approach calculates the distributed system inertia accurately in a real-time context. 2) The proposed method can be easily applied to any large, interconnected power system with different types of dynamic models. 3) The method can incorporate a non-linear model. 4) The estimation of bus inertia does not require rigorous mathematical derivations and the availability of small-signal models for the entire network. Therefore, the bus inertia assessment method can be computationally efficient and thus can be easily augmented in an online monitoring scheme to enable power system operators to take the proper control actions when disturbances are experienced. 5) The estimated online bus inertia can be realized as a distribution of the total grid inertia and thus can be used to find the strength of a specific area or zone in the network.

Furthermore, applications of the proposed calculated bus inertias include at least the following. a) The estimated bus inertias can be directly used as an indicator for calculating the network sensitivity to the changes in loading conditions and thus improve the demand-side flexibility. This can be achieved without doing a small-signal analysis. b) The proposed method can identify coherency grouping and the best placement of a wide-area damping controller to enhance the overall damping of low-frequency inter-area modes of oscillations. c) The estimated bus inertia can assist in differentiating the entire power system into zones like strong zone/green zone, medium zone/orange zone, and weak zone/red zone. As a result, the optimal phasor measurement unit (PMU) placement for each zone can be easily evaluated. d) Moreover, bus inertia can be employed to find an optimal location of bulk RES to be integrated into a large power network. However, it may not always be feasible to install RES at the optimum location due to resource constraints. In such a case, the bus inertia computation technique can help define vulnerable zones for the inter-connection of RES. In addition, the bus inertia assessment method can provide recommendations for planning the network up-gradation in different ways, like load shifting, topological changes, or HVDC inter-connections.

BRIEF DESCRIPTION OF THE DRAWINGS

Various embodiments in accordance with the present disclosure will be described with reference to the drawings, in which.

DETAILED DESCRIPTION OF THE INVENTION

Figure 1:
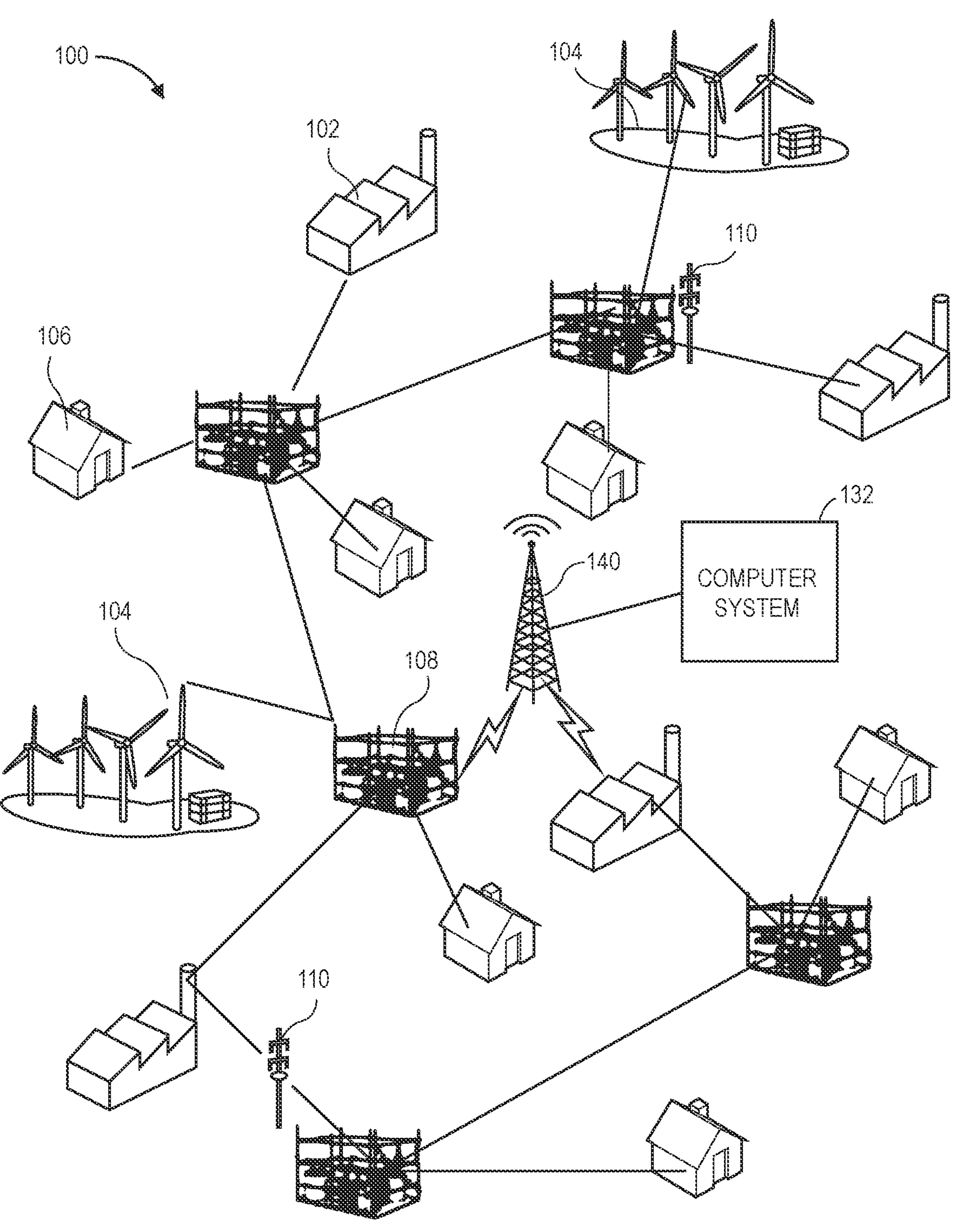
FIG. 1 shows a power grid environment for modeling bus inertia of a power grid, according to one example of the present disclosure.

Certain aspects and examples of the present disclosure relate to assessing power grid systems through a calculation of bus inertia, which can capture power system dynamics and facilitate a computation of real-time grid flexibility. Bus inertia can be defined as the distribution of the total inertia across all system buses located in different geographical regions. Hence, a formulation can be derived for computing bus inertia using an augmented admittance matrix, bus voltages, line parameters, inertia constants, and internal voltage setpoints of synchronous machines. Using the bus inertia assessment method, bus inertia can also be calculated directly without developing a linearized model for hybrid networks, which can be complicated and computationally expensive. The computation of bus inertia can be utilized during planning and operation phases that span long and short-term horizons to enhance power system flexibility. Furthermore, the bus inertia assessment method can assist in identifying spatial system strength for any area or zone. As a result, the bus inertia assessment method can be used to meet the increasing penetration levels of renewable energy resources (RES) and enhance the power grid flexibility. Calculated bus inertia (and, eventually, system inertia) can also be used for load shifting, wide area damping controller (WADC) allocation, coherency detection, placement of RES, and energy storage systems (ESS) to ensure stable and flexible operation of power grids. The performance of the bus inertia assessment method has been tested and verified using the IEEE 39 bus and IEEE 68 bus standard test systems.

The bus inertia assessment method includes use of an augmented admittance matrix for any power system with generator and bus voltages. The augmented admittance matrix can be presented as:

$$\begin{bmatrix} \bar{I}_g(t) \\ \bar{I}_b(t) \end{bmatrix}_{(n_g+n_b)\times 1} = \begin{bmatrix} \bar{Y}_{gg} & \bar{Y}_{gb} \\ \bar{Y}_{bg} & \bar{Y}_{bb} \end{bmatrix}_{(n_g+n_b)\times(n_g+n_b)} \begin{bmatrix} \bar{v}_g(t) \\ \bar{v}_b(t) \end{bmatrix}_{(n_g+n_b)\times 1} \quad (1)$$

where the subscript g is used to denote generator nodes and the subscript b is used for the remaining nodes. $n_g$ and $n_b$ are the number of generator buses and other buses. $\bar{\imath}_g$, $\bar{\imath}_b$, $\bar{v}_g$, and $\bar{v}_b$ are current injections and voltages for generator buses and other buses, respectively. The elements of the admittance matrix are identified as follows: $\bar{Y}_{ii}$ is the sum of all admittances connected to node i, and $\bar{Y}_{ij}$ is the negative of the admittance between nodes i and j. Replacing generator bus voltage $\bar{v}_g$ with its internal emf voltage ($\bar{e}_g$) behind internal impedances, using $\bar{v}_g=\bar{e}_g-\bar{\imath}_g Z_g$, then eqn. (1) turns to:

$$\begin{bmatrix} \bar{I}_g(t) \\ \bar{I}_b(t) \end{bmatrix} = \begin{bmatrix} L^{-1}\bar{Y}_{gg} & L^{-1}\bar{Y}_{gb} \\ \bar{Y}_{bg} - \bar{Y}_{bg}(L^{-1}\bar{Y}_{gg})Z_g & \bar{Y}_{bb} - \bar{Y}_{bg}(L^{-1}\bar{Y}_{ng})Z_g \end{bmatrix} \begin{bmatrix} \bar{e}_g(t) \\ \bar{v}_b(t) \end{bmatrix} \quad (2)$$

where, $L=(I+Y_{nn}Z_g)$ and $Z_g$ is the generator impedance.

Thus, eqn. (2) can be written as:

$$\begin{bmatrix} \bar{I}_g(t) \\ \bar{I}_b(t) \end{bmatrix}_{(n_g+n_b)\times 1} = \begin{bmatrix} \bar{Y}_{nn} & \bar{Y}_{nr} \\ \bar{Y}_{rn} & \bar{Y}_{rr} \end{bmatrix}_{(n_g+n_b)\times(n_g+n_b)} \begin{bmatrix} \bar{e}_g(t) \\ \bar{v}_b(t) \end{bmatrix}_{(n_g+n_b)\times 1} \quad (3)$$

The bus current injection $\bar{\imath}_b$ is assumed to be negligible when loads are converted to equivalent bus admittance. Using (3), the bus current at time $t_0$ can be written as:

$$0 = \bar{Y}_{rn}(t)\times\bar{e}_g(t) + \bar{Y}_{rr}(t)\times\bar{v}_b(t) \quad (4)$$

$$0 = \bar{Y}_{rn0}\times|e_{g0}|\cdot e^{j\delta_0} + \bar{Y}_{rr0}\times|v_{b0}|\cdot e^{j\theta_0} \quad (5)$$

where $\cdot$ denotes element-wise matrix multiplication. Due to a small perturbation at time $t\approx t_0+\Delta t$, the bus current can be presented as:

$$0 = \bar{Y}_{rn}(t)\times|e_{g0}+\Delta e_g|\cdot e^{j(\delta_0+\Delta\delta)} + \bar{Y}_{rr}(t)\times|v_{b0}+\Delta v_b|\cdot e^{j(\theta_0+\Delta\theta)} \quad (6)$$

Taking the time derivative of (6) yields:

$$0 = \bar{Y}_{rn}(t)\times j\frac{d\Delta\delta}{dt}\cdot\bar{e}_g(t) + \bar{Y}_{rn}(t)\times\frac{d|\Delta e_g|}{dt}\cdot e^{j(\delta_0+\Delta\delta)} + \bar{Y}_{rr}(t)\times j\frac{d\Delta\theta}{dt}\cdot\bar{v}_b(t) + \bar{Y}_{rr}(t)\times\frac{d|\Delta v_b|}{dt}\cdot e^{j(\theta_0+\Delta\theta)} \quad (7)$$

where, admittance is assumed constant over $\Delta t$ and as $$\frac{d}{dt}\left(\frac{\Delta e_g}{(e_{g0}+\Delta e_g)}\right)\approx 0 \text{ and } \frac{d}{dt}\left(\frac{\Delta v_b}{(v_{b0}+\Delta v_b)}\right)\approx 0,$$

eqn. (7) becomes:

$$0 = \bar{Y}_{rn}(t)\times[\Delta\bar{\omega}_g(t)\cdot\bar{e}_g(t)] + \bar{Y}_{rr}(t)\times[\Delta\bar{\omega}_b(t)\cdot\bar{v}_b(t)] \quad (8)$$

$$\Delta\bar{\omega}_b(t)\cdot\bar{v}_b(t) = \left[-\bar{Y}_{rr}(t)^{-1}\times\bar{Y}_{rn}(t)\right]\times[\Delta\bar{\omega}_g(t)\cdot\bar{e}_g(t)] \quad (9)$$

$$\Delta\bar{\omega}_b(t) = \left\{\left(-\bar{Y}_{rr}(t)^{-1}\times\bar{Y}_{rn}(t)\right)\cdot/\bar{v}_b(t)\right\}\times[\bar{e}_g(t)\cdot\Delta\bar{\omega}_g(t)] \quad (10)$$

$$\Delta\bar{\omega}_b(t) = \left[\left\{\left(-\bar{Y}_{rr}(t)^{-1}\times\bar{Y}_{rn}(t)\right)\cdot/\bar{v}_b(t)\right\}\cdot^*\bar{e}_g(t)\right]\times\Delta\bar{\omega}_g(t) \quad (11)$$

where ·/ denotes row-wise matrix division and ·* denotes column wise multiplication show that original matrix dimension ($n_b\times n_g$) doesn't change. Neglecting losses and machine damping, the total angular momentum of the generator buses should be equal to the total angular momentum of the load buses and is given by:

$$2\sum_{i=1}^{n_g} H_{G_i}\Delta\omega_{G_i} \approx 2\sum_{i=1}^{n_g} H_{B_i}\Delta\omega_{B_i} \quad (12)$$

Using (11) and (12) leads to:

$$\bar{H}_B(t) = \left[\left\{\left(-\bar{Y}_{rr}(t)^{-1}\times\bar{Y}_{rn}(t)\right)\cdot/\bar{v}_b(t)\right\}\cdot^*\bar{e}_g(t)\right]\times\bar{H}_G \quad (13)$$

$$\bar{H}_B(t)_{(n_b\times 1)} = \bar{W}_B(t)_{(n_b+n_g)}\times\bar{H}_{G_{(n_g\times 1)}} \quad (14)$$

where $\overline{W}_B(t)$ refers to the bus weightage matrix which allows calculating the inertia of load buses in real-time, $\overline{H}_G$ is the generator inertia matrix and $\overline{H}_B$ is the bus inertia matrix. Thus, a bus close to a generator will have high weightage corresponding to that generator inertia. In other words, the weighting matrix $\overline{W}_B(t)$, also measures the electrical distances corresponding to the generators' physical inertia. It can be seen from Eqn. (11) that $\Delta\overline{\omega}_b(t)$ can be properly computed as long as $\overline{v}_b(t)\neq 0$. However, this condition may be violated during fault period when the voltage at the faulted bus drops to exactly zero in the case of bolted three-phase to ground faults. As a result, $\Delta\overline{\omega}_b(t)$ is undefined and thus numerical instability is experienced. To alleviate this issue, it is assumed that $\overline{v}_b(t)\approx 1$p.u. during fault period which lasts usually for a few milliseconds. Furthermore, the phase angle of a bus cannot be determined with a voltage magnitude of zero due to a ground zero impedance fault. As such, phase angles and frequencies during a fault are of little significance and thus $\overline{W}_B(t)$ turns to:

$$\overline{W}_B(t) = \left(-\overline{Y}_{rr}(t)^{-1}\,\overline{Y}_{rn}(t)\right),\ \text{when } t = t_f \text{ else} \tag{15}$$

$$\overline{W}_B(t) = \left[\left\{-\overline{Y}_{rr}(t)^{-1} \times \overline{Y}_{rn}(t) \cdot / \overline{v}_b(t)\right\} .^{*}\ \overline{e}_g(t)\right]$$

where $t_f$ is the fault time. The strength of grid inertia or system inertia can be defined as:

$$Sys_{str}(t) = \sum_{B=1}^{n_b} H_B(t)\ (\text{sec}) \tag{16}$$

where $Sys_{str}$ is defined as the strength of grid inertia or system inertia, which virtually depends on the admittance matrix or the orientation of buses.

Performance of the bus inertia assessment method can be evaluated using the IEEE 39 bus New England bus test system or the IEEE 68 bus test system. Both test systems can be modeled in MATLAB/Simulink. Synchronous generators can be equipped with power system stabilizers and automatic voltage regulators to replicate behavior of an actual power grid system.

TABLE 1 shows weighting vectors at steady-state for some representative load buses. Inertia dynamics of bus 9 depend mainly on $H_1$, whereas the inertia dynamics of bus 20 depend on $H_4$ and $H_5$. Electrical distance between a bus and respective generator buses is an important factor in determining the inertial dynamics of a bus. The inertia dynamics of bus 14, which has an approximately equivalent electrical distance to all generator buses, are influenced by all of the generators.

TABLE I

| WEIGHTING VECTOR OF IEEE 39 BUS $\overline{W}$ | | | | | | |
|---|---|---|---|---|---|---|
| BUS | GEN 1 | GEN 2 | GEN 3 | GEN 4 | GEN 5 | GEN 6 |
| 9 | 0.57 | 0.07 | 0.08 | 0.04 | 0.03 | 0.05 |
| 14 | 0.22 | 0.07 | 0.09 | 0.11 | 0.08 | 0.12 |
| 20 | 0.17 | 0.06 | 0.08 | 0.21 | 0.22 | 0.12 |

TABLE I-continued

| WEIGHTING VECTOR OF IEEE 39 BUS $\overline{W}$ | | | | |
|---|---|---|---|---|
| BUS | GEN 7 | GEN 8 | GEN 9 | GEN 10 |
| 9 | 0.04 | 0.03 | 0.05 | 0.08 |
| 14 | 0.09 | 0.07 | 0.12 | 0.15 |
| 20 | 0.09 | 0.05 | 0.08 | 0.11 |

FIG. 1 shows a generalized layout of a power grid environment 100 for modeling bus inertia of a power grid, according to one example of the present disclosure. Other examples in this disclosure use an IEEE 39 bus test system to illustrate modeling bus inertia. Included in the power grid environment 100 are power plants 102, renewable energy sources (RES) 104, loads 106, substations 108, phasor measurement units (PMUs) 110, a computer system 132, and one or more communication networks 140. Four power plants 102 are shown in FIG. 1, although only one is associated with a numerical indicator in FIG. 1. Six loads 106 are shown in FIG. 1, though only one is associated with a numerical indicator in FIG. 1. Five substations 108 are shown in FIG. 1, although only one is associated with a numerical indicator in FIG. 1.

The power plants 102 and the RES 104 can provide energy to the loads 106 through at least one of the substations 108. Loads 106 can include residences, factories, office buildings, venues, etc. Each of the power plants 102 can include at least one synchronous machine. All of the synchronous machines within the power grid environment 100 can contribute to the system inertia of the power grid environment 100. The substations 108 can include at least one bus. The computer system 132 can assess bus inertia for the power grid environment 100 and cause at least one action to be implemented based on the bus inertia. For example, the computer system 132 can assist a power grid operator in determining locations to place the PMUs 110 within the power grid environment 100 based on the bus inertia.

The computer system 132 may send to or receive from data the power plants 102, the RES 104, the substations 108, and the PMUs 110 over the one or more communication networks 140. The one or more communication networks 140 may correspond to one or more Wide Area Networks ("WANs"), such as the Internet, through which the power generators 102, the RES 104, the substations 108, the PMU 110, and the computer system 132 may communicate with servers via web browsers or client-side applications, to establish communication sessions, request and receive web-based resources, and access other features of applications or services.

Figure 2:
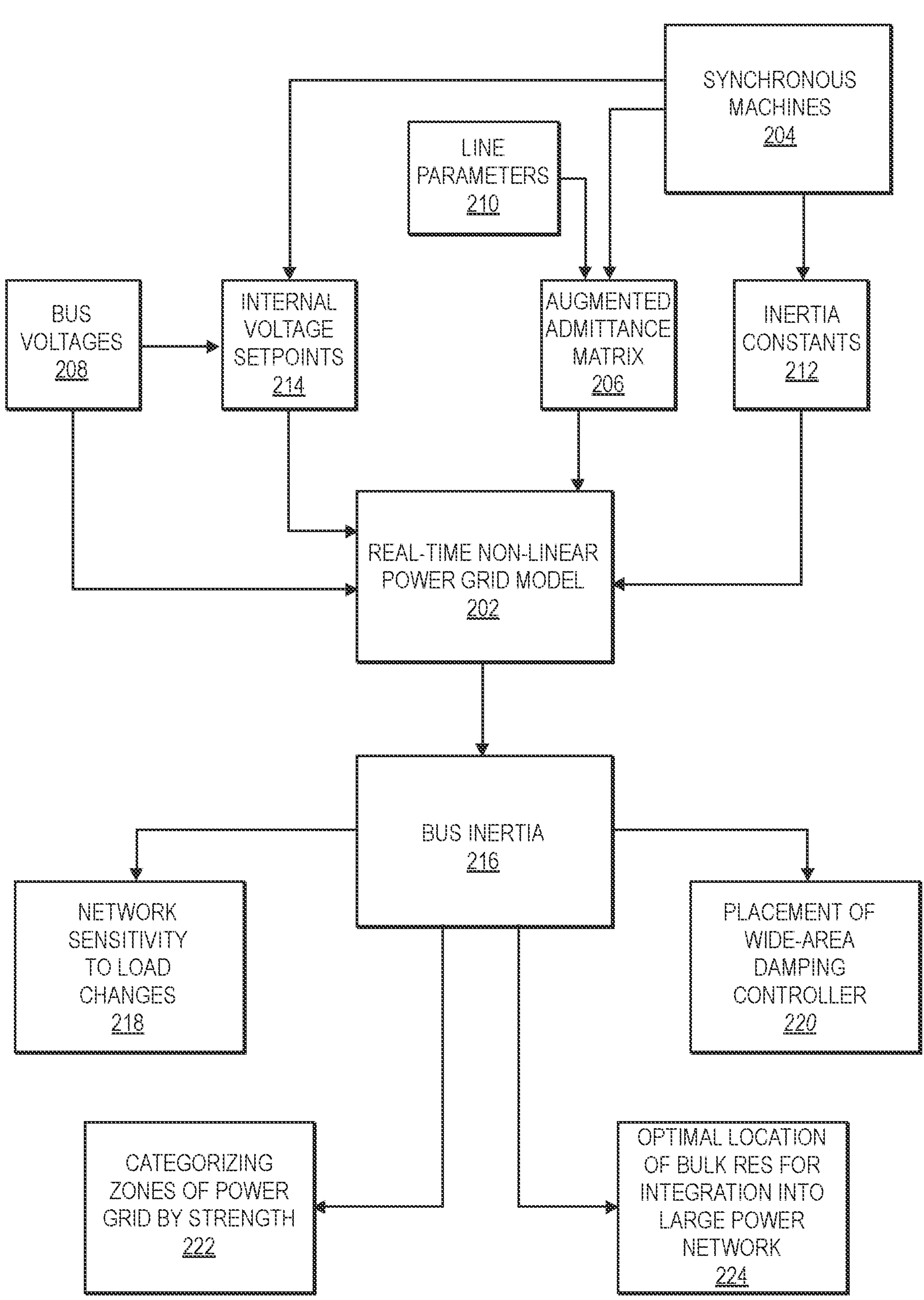
FIG. 2 shows a block diagram of a real-time model for determining bus inertia of a power grid, according to one example of the present disclosure.

FIG. 2 shows a block diagram of a real-time non-linear power grid model 202 for determining bus inertia 216 of a power grid, according to one example of the present disclosure. This real-time non-linear power grid model 202 can be hosted (e.g., stored as executable program code) on a computer system, such as the computer system 132 of FIG. 1. Input data for the real-time model can include characteristics from a plurality of synchronous machines 204 and PMUs 110. The characteristics can include an augmented admittance matrix 206, bus voltages 208, line parameters 210, inertia constants 212, or internal voltage setpoints 214. The augmented admittance matrix 206 includes information associated with the synchronous machines 204 and the line parameters 210. The inertia constants 212 can be based on the synchronous machines 204. The internal voltage setpoints 214 includes values associated with the synchronous machines 204 and the bus voltages 208. The input data can be received in real-time, such that data is received while the power grid is in operation.

The real-time non-linear power grid model 202 can generate bus inertia 216. The bus inertia 216 can indicate a distribution of total inertia across a plurality of buses located in different geographic regions of the power grid. Inertia for a bus can indicate a capability of the bus to resist changes when a disturbance occurs. A computer system 132 can cause at least one action to be implemented based on the bus inertia 216. The at least one action can include determining network sensitivity to load changes 218, determining placement of a WADC 220, categorizing zones of the power grid by strength 222, or determining an optimal location of bulk RES for integration into a large power network 224.

Figure 3:
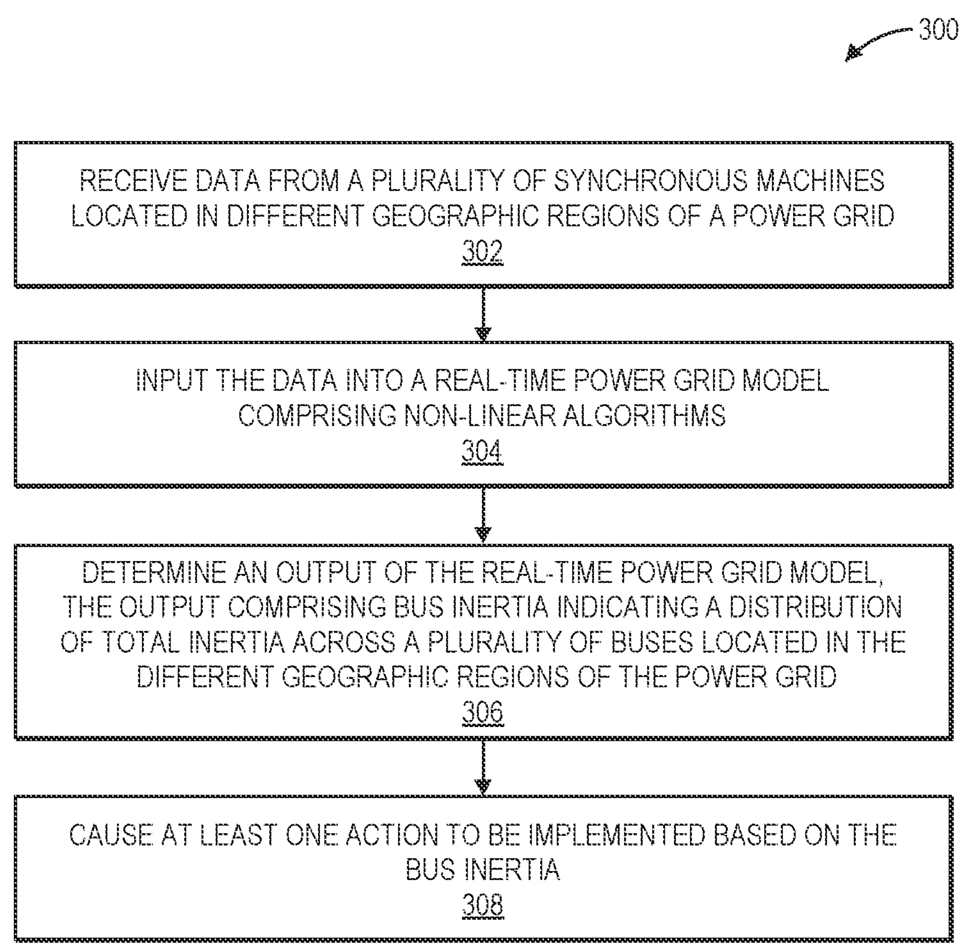
FIG. 3 is a flowchart of a process 300 for determining bus inertia of a power grid, according to one example of the present disclosure.

FIG. 3 is a flowchart of a process 300 for determining bus inertia of a power grid, according to one example of the present disclosure. The process 300 may be performed by a computer system, such as the computer system 132 of FIG. 1. At block 302, the process involves receiving data from a plurality of synchronous machines 204 and PMUs 110 located in different geographic regions of a power grid. The data can include an augmented admittance matrix, a bus voltage, a line parameter, an inertia constant, or an internal voltage setpoint. The data can be received in real-time from the plurality of synchronous machines, while power generators 102 and RES 104 are in operation. In some examples, at least two synchronous machines of the plurality of synchronous machines are associated with different types of dynamic models and/or different dynamic structures.

At block 304, the process 300 involves inputting the data into a real-time power grid model comprising non-linear algorithms. In some examples, the data is input to the real-time power grid model in real-time. Real-time means that the data can be processed without delay or without scheduling. The processing of the data can occur as soon as possible given system constraints such as any network latency, processing latency, etc.

At block 306, the process 300 involves determining an output of the real-time power grid model, the output including bus inertia indicating a distribution of total inertia across a plurality of buses located in the different geographic regions of the power grid. Inertia for a bus can indicate a capability of the bus to resist changes when a disturbance occurs. In some examples, the real-time power grid model can help predict bus inertia under altered conditions for the power grid environment 100. For example, the altered conditions can include adding more RES to a location in the power grid. The altered conditions can also include a disturbance such as a three-phase to ground-fault at a particular bus.

At block 308, the process 300 involves causing at least one action to be implemented based on the bus inertia. The at least one action can include categorizing zones of the power grid according to strength. For example, the zones can be categorized as strong, medium, or weak based on values of inertia for buses in the zone. Zones with relatively high values of bus inertia can be categorized as strong.

The at least one action can include determining a location to place a WADC. The WADC can include a system of components that mitigate oscillations of frequency. Strategic positioning of a WADC in a power grid environment can improve system response to disturbances by suppressing unwanted oscillations.

The at least one action can include determining a location to place a plurality of RES 104. However, it may not always be feasible to install RES 104 at an optimum location due to resource constraints. In such a case, the at least one action can include defining vulnerable zones within the power grid environment 100 for the inter-connection of RES 104. The at least one action can include determining a location to install a PMU 110.

The at least one action can include determining at least one recommendation for planning a network upgrade. The at least one recommendation can include at least one of load shifting, topological changes, or high voltage, direct current (HVDC) inter-connections. The at least one action can also include calculating network sensitivity to changes in loading conditions or identifying coherency grouping for the plurality of buses. The at least one recommendation can include selecting a control action in response to a disturbance in the power grid.

Figure 4:
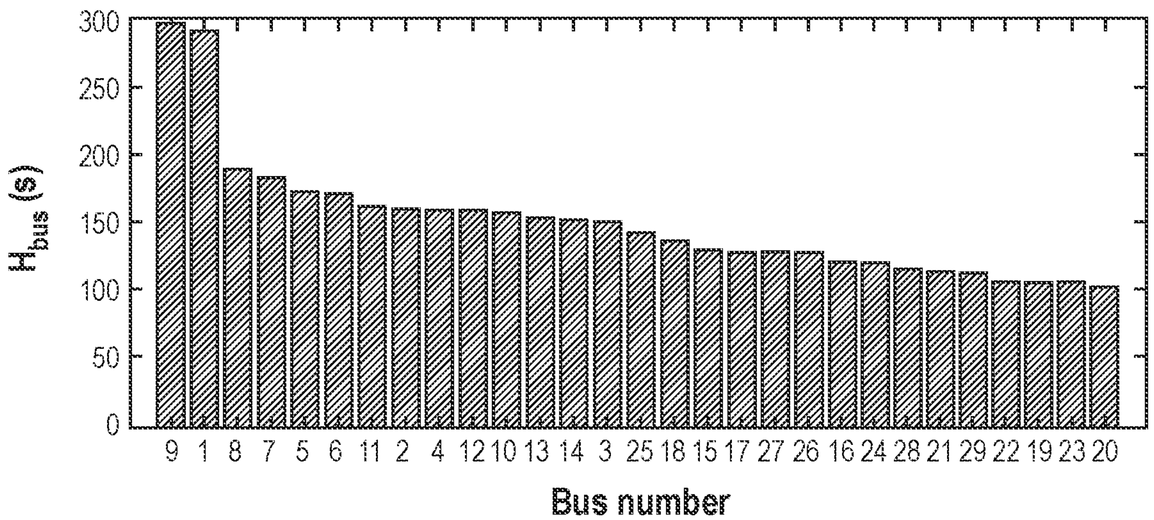
FIG. 4 is a graph depicting bus inertia for each bus using an IEEE 39 bus test system, according to one example of the present disclosure.

FIG. 4 is a graph depicting estimated bus inertia for each bus using an IEEE 39 bus test system, according to one example of the present disclosure. FIG. 4 shows the estimated bus inertias of the IEEE 39 bus test system. Buses 20 and 9 have the lowest and highest inertias, respectively. In addition, results depicted in FIG. 4 are like other results reported by other research groups, even though the other results are based on a sensitivity analysis that involves linearization of a system model. The results depicted in FIG. 4 are achieved using a generic model that is not constrained with specific dynamic models for system components and thus can be applied to any power system.

Figure 5:
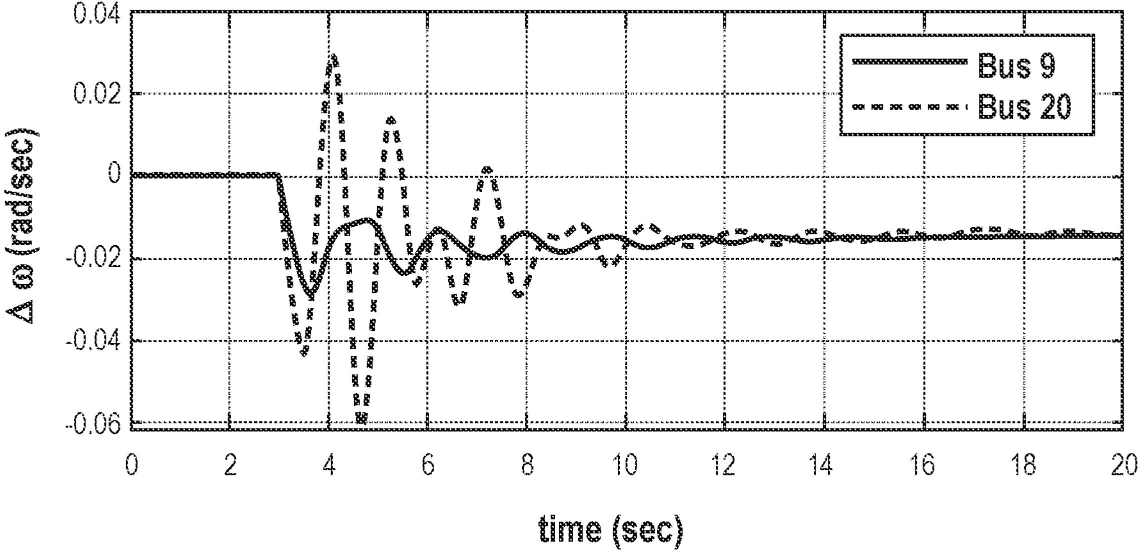
FIG. 5 is a graph depicting frequency dynamics of two buses in response to a disturbance in a power grid system, according to one example of the present disclosure.

FIG. 5 is a graph depicting frequency dynamics of two buses in response to a disturbance in a power grid system, according to one example of the present disclosure. The disturbance in this example is a 100 MW load is suddenly applied to bus 29 at a time t=3 sec. FIG. 5 indicates that the frequency of bus 9 quickly settles to a steady-state operating point in comparison to bus 20. The main reason for this observation is that bus 9 is the closest to the center of inertia for the system. The center of inertia is directly connected to the machine with the largest inertia. In contrast, bus 20 is the furthest location from the center of inertia.

Figure 6:
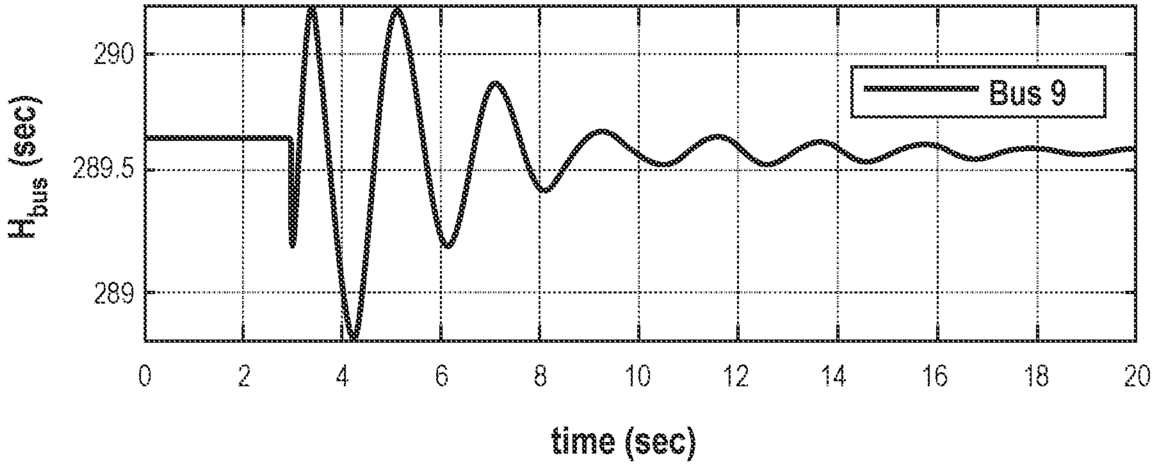
FIG. 6 is a graph depicting bus inertia dynamics of bus 9 in response to a disturbance in a power grid system, according to one example of the present disclosure.

FIG. 6 is a graph depicting bus inertia dynamics of bus 9 in response to a disturbance in a power grid system, according to one example of the present disclosure. The disturbance is the same disturbance detailed above in the description of FIG. 5.

Figure 7:
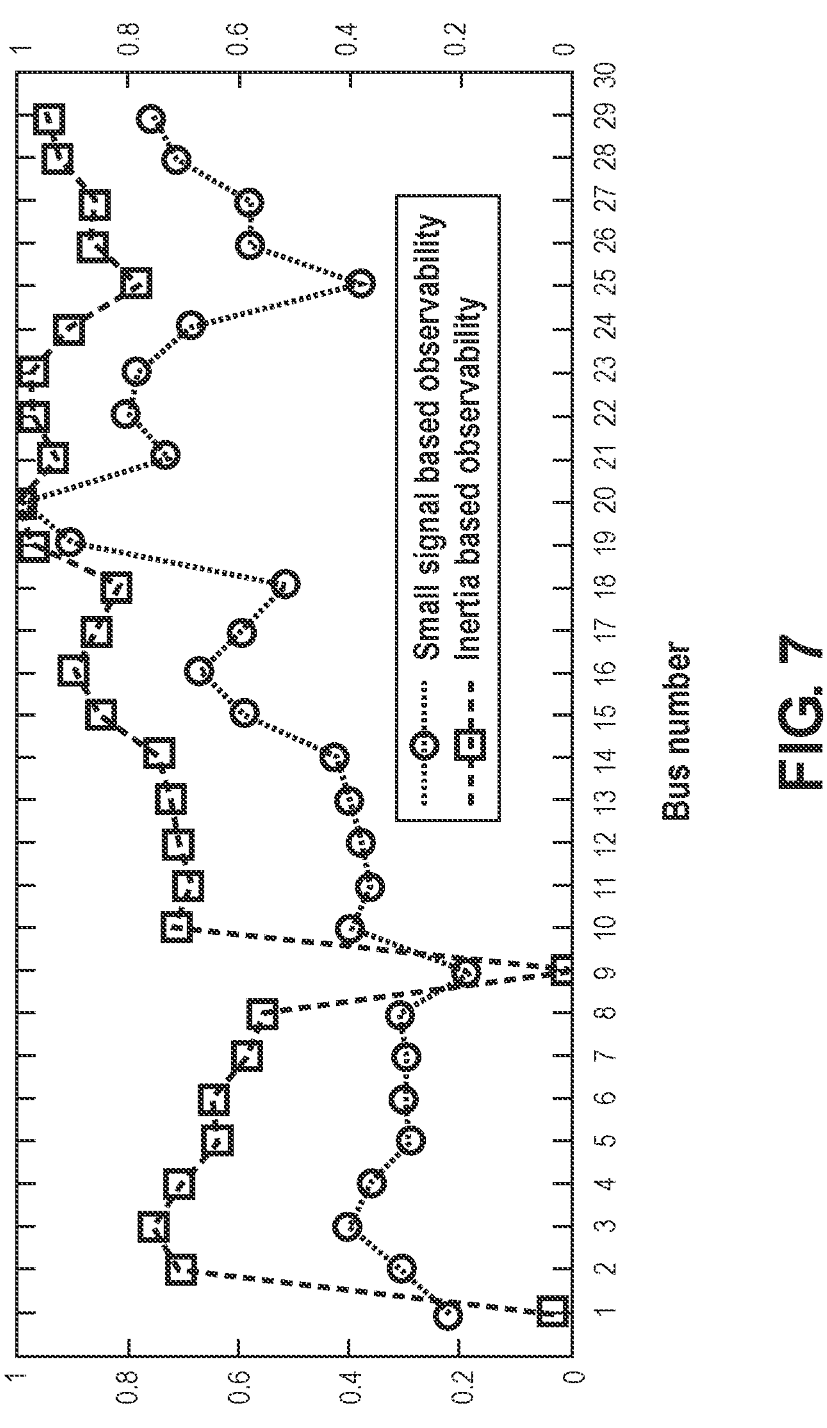
FIG. 7 is a graph comparing actual bus observability obtained from two methods, according to one example of the present disclosure.

FIG. 7 is a graph comparing actual bus observability obtained from two methods, according to one example of the present disclosure. Computed inertia at a specific bus is inversely related to its observability. Low inertia buses are associated with higher oscillatory response and thus have high observability. As a result, buses 20 and 9 have the highest and lowest observability, respectively. These observations are further validated by performing a small-signal analysis at normal operating conditions where the normalized observability of system buses is calculated.

FIG. 7 compares the actual bus observability obtained from modal analysis (curve with circles) with observability computed from an approach described by the present disclosure: normalized inverse of estimated bus inertia (curve with squares). For both cases, the distribution of observability across the entire system follows similar patterns and has the same rank. For practical application purposes, the numerical values of bus observability are seldom used in contrast to its rank. Thus, estimation of bus inertia can substitute the whole complicated process of finding the observability matrix without the need to conduct a small-signal analysis. In addition, the method including the normalized inverse of estimated bus inertia makes the computation of bus observability more practical for any large network.

Figure 8:
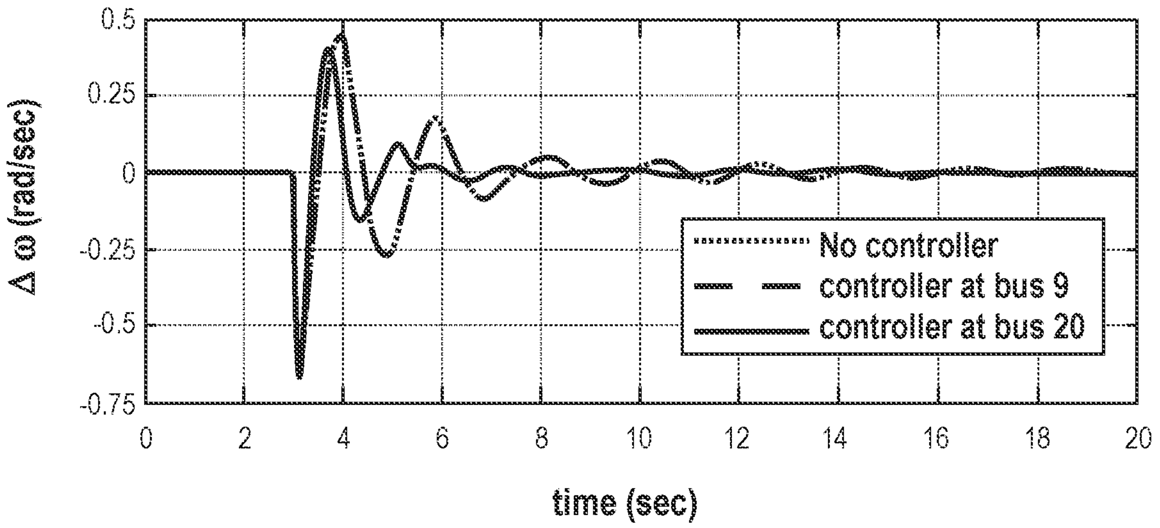
FIG. 8 is a graph of speed dynamics for a representative generator, $G_1$, under multiple conditions after a three-phase to ground-fault is applied at bus 14, according to one example of the present disclosure.

FIG. 8 is a graph of speed dynamics for a representative generator, $G_1$, under multiple conditions after a three-phase to ground-fault is applied at bus 14, according to one example of the present disclosure. A critical inter-area mode is found with a frequency of 0.59 Hz for IEEE 39 bus. In this example, a three-phase to ground-fault is applied at bus 14 at time t=3 sec and is naturally cleared after 100 msec (as indicated by the curve labeled 'no controller'). The red curve depicts the speed dynamics of representative generator $G_1$ when a wide-area damping controller (WADC) is deployed at bus 20. The response is significantly improved, and the oscillations are suppressed around 6 s as the supplementary damping is provided by the deployed WADC. In this example, the oscillations are only damped when the WADC is placed at the most observable bus (see curve labeled 'controller at bus 20') in comparison to placing the WADC at the least observable bus 9 (see curve labeled 'controller at bus 9').

Figure 9:
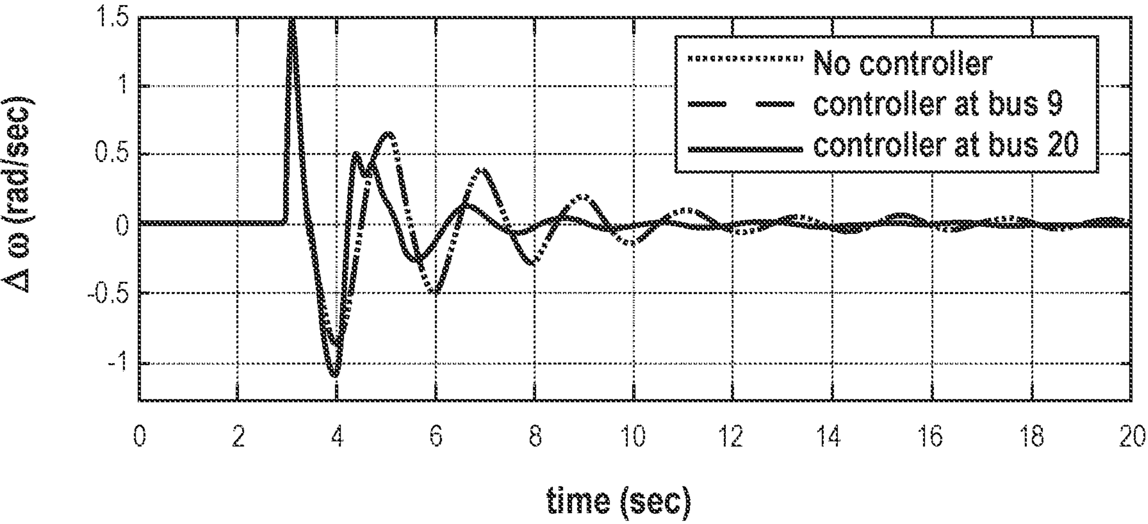
FIG. 9 is a graph of speed dynamics for a second representative generator, $G_2$, under multiple conditions after a three-phase to ground-fault is applied at bus 14, according to one example of the present disclosure.

FIG. 9 is a graph of speed dynamics for a second representative generator, $G_2$, under multiple conditions after a three-phase to ground-fault is applied at bus 14, according to one example of the present disclosure. In this example, the same three-phase to ground-fault that was described with regards to FIG. 8 is applied at bus 14. The curve labeled 'no controller' depicts the speed dynamics for the second representative generator, $G_2$, without placement of a WADC. The curve labeled 'controller at bus 9' shows the speed dynamics when the WADC is placed at bus 9. The curve labeled 'controller at bus 20' depicts the speed dynamics when the WADC is placed at bus 20. The WADC enhanced the damping ratio of the critical mode for the two representative generators, G1 and $G_2$, when it is placed at bus 20.

Figure 10:
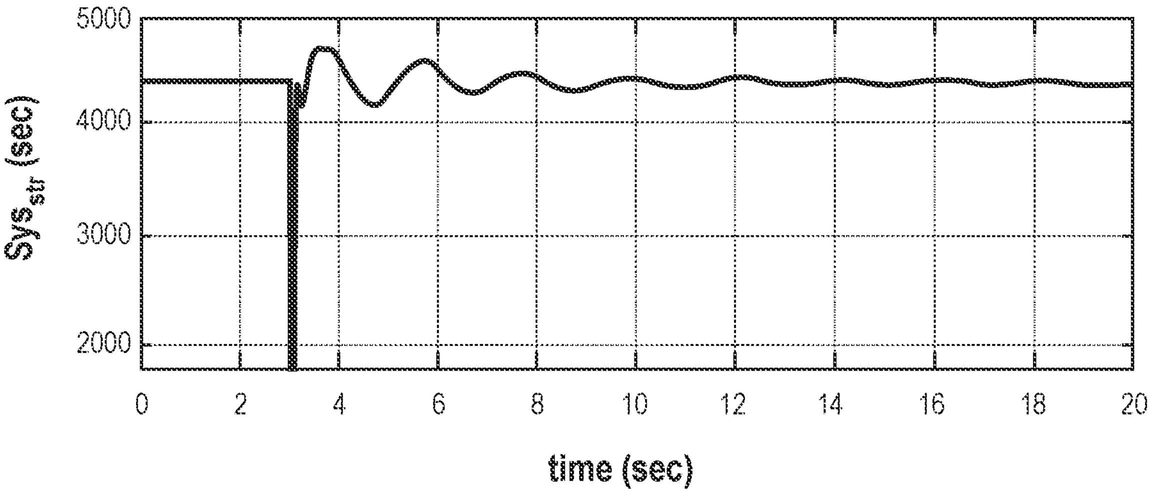
FIG. 10 is a graph depicting dynamics of system inertia after a three-phase to ground-fault is applied at bus 14, according to one example of the present disclosure.

FIG. 10 is a graph depicting dynamics of system inertia after a three-phase to ground-fault is applied at bus 14, according to one example of the present disclosure. The same three-phase to ground-fault that was described with regards to FIG. 8 is applied at bus 14. System inertia is plotted on the y axis and time is plotted on the x axis.

Figure 11:
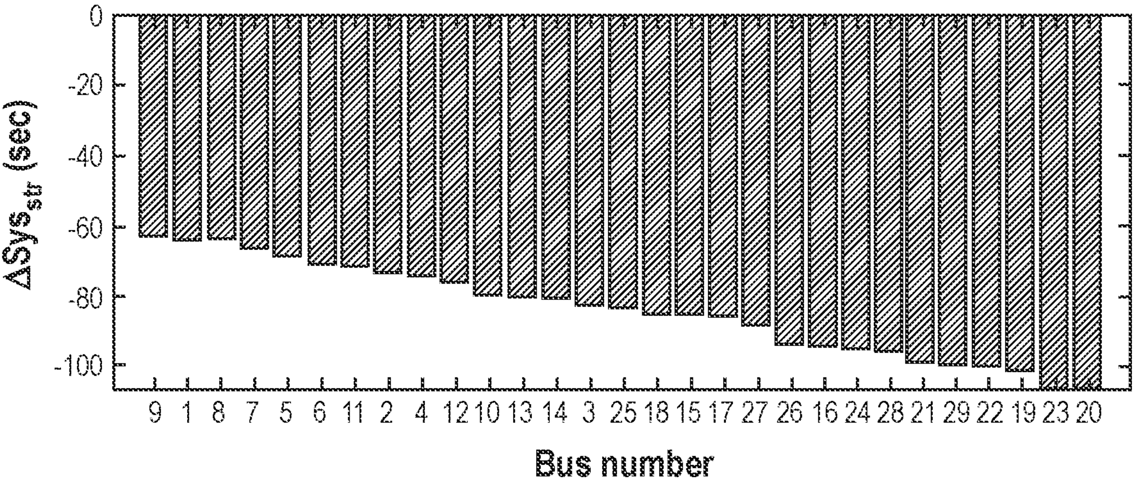
FIG. 11 is a graph of changes in system inertia due to an increase in load at each bus, according to one example of the present disclosure.

FIG. 11 is a graph of changes in system inertia due to an increase in load at each bus, according to one example of the present disclosure. Comprehensive investigations have revealed that system dynamics depend on an amount of load deviation and a location of the load deviation. By increasing load level, load damping may increase. However, overall system stability may deteriorate. FIG. 11 shows system inertia changes due to an increase of 300 MW load at respective buses. The graph shows that system inertia is adversely affected when the load at bus 8 increases.

Figure 12:
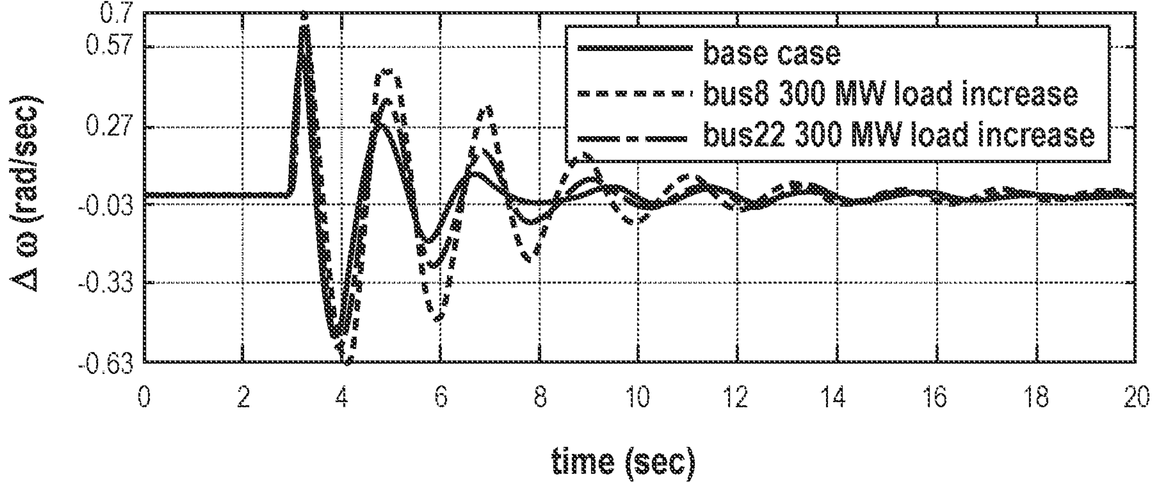
FIG. 12 is a graph depicting dynamic response of generator, $G_{10}$, after a three-phase to ground fault is applied at bus 14 under multiple load conditions, according to one example of the present disclosure.

FIG. 12 is a graph depicting dynamic response of generator, $G_{10}$, after a three-phase to ground fault is applied at bus 14 under multiple load conditions, according to one example of the present disclosure. The y axis displays a change in angular frequency for generator, $G_{10}$, and the x axis is time in seconds. To produce the curve labeled 'base case', the same three-phase to ground-fault that was described with regards to FIG. 8 is applied at bus 14. The curve labeled 'bus 8 300 MW load increase' represents the same three-phase to ground-fault while a 300 MW load increase is applied at bus 8. The curve labeled 'bus 20 300 MW load increase' represents the same three-phase to ground-fault while a 300 MW load increase is applied at bus 22. The graph shows that a load increment at bus 8 is more detrimental than a load increment at bus 22.

Figure 13:
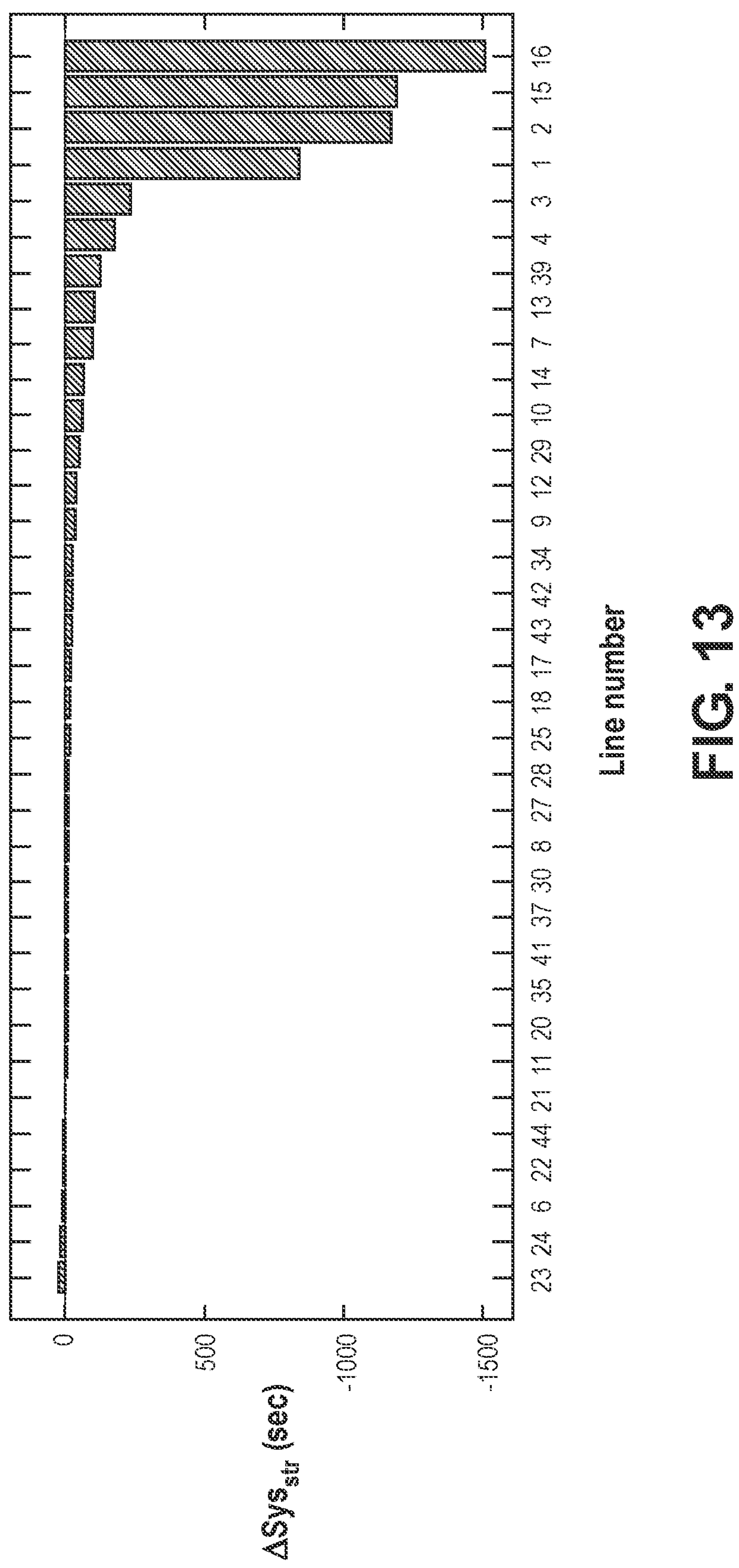
FIG. 13 is a graph of changes in system inertia due to removal of individual lines in the power grid, according to one example of the present disclosure.

FIG. 13 is a graph of changes in system inertia due to removal of individual lines in the power grid, according to one example of the present disclosure. Changes in system topology can impact system inertia and can adversely affect overall stability characteristics in the power grid. The proposed method can facilitate study of the impact of topology changes without a need to linearize the system for each topological change studied. The graph shows that removal of line 16 that connects buses 9 and 39 results in a large decrease in system inertia, affecting stability of the system. Conversely, removal of line 23 that connects buses 14 and 15 leads to a slight increase in the system inertia.

Figure 14:
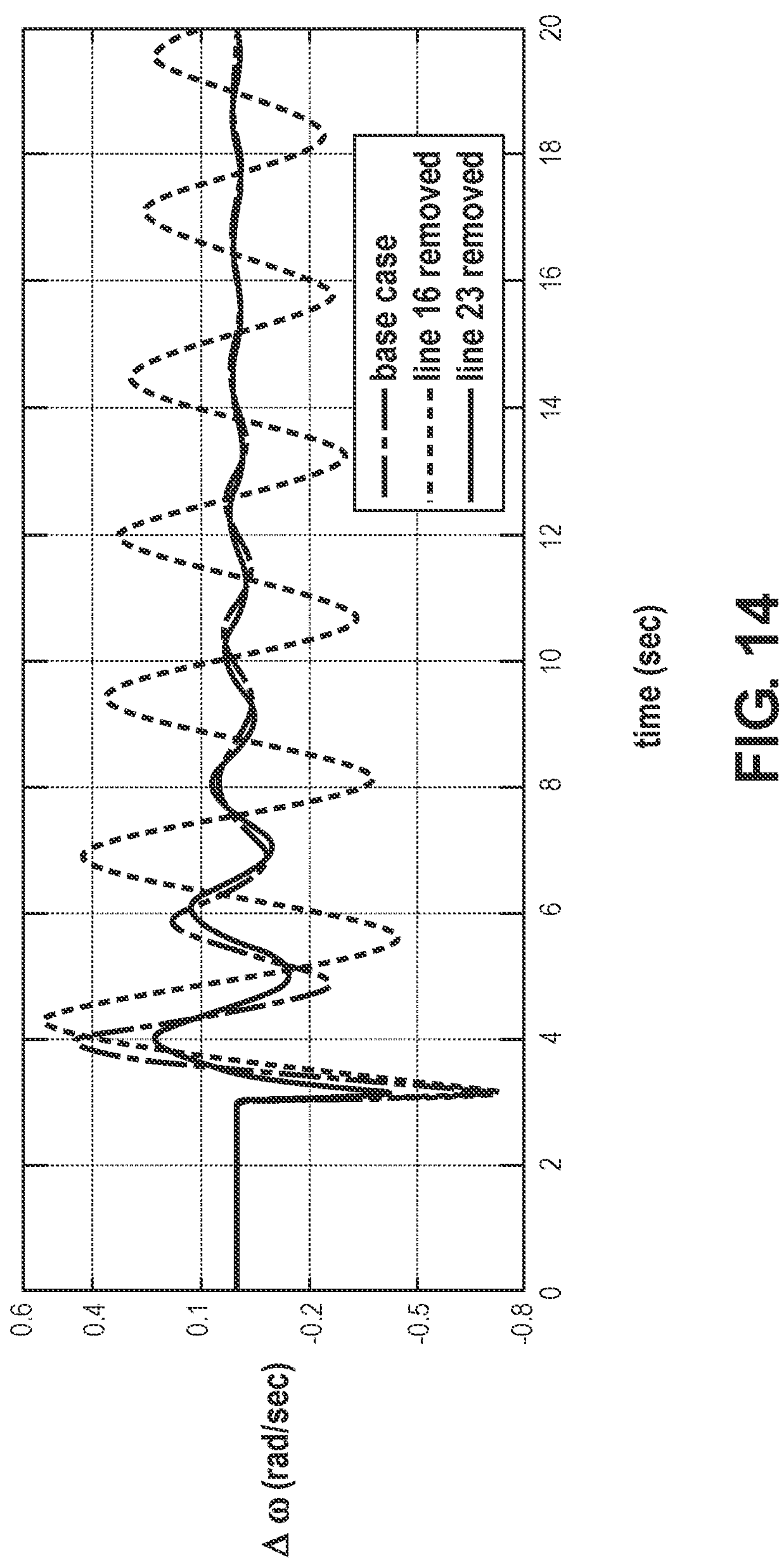
FIG. 14 is a graph depicting dynamic response of generator, $G_1$, after a three-phase to ground fault is applied at bus 14 under multiple system topology conditions, according to one example of the present disclosure.

FIG. 14 is a graph depicting dynamic response of generator, $G_1$, after a three-phase to ground fault is applied at bus 14 under multiple system topology conditions, according to one example of the present disclosure. To produce the 'base case' curve, the same three-phase to ground-fault that was described with regards to FIG. 8 is applied at bus 14. The curve labeled 'line 16 removed' represents the same three-phase to ground-fault while line 16 is removed from the power grid. The curve labeled 'line 23 removed' represents the same three-phase to ground-fault while line 23 is removed from the power grid. The removal of line 16 adversely affects stability of the system in comparison with removal of line 23.

Figure 15:
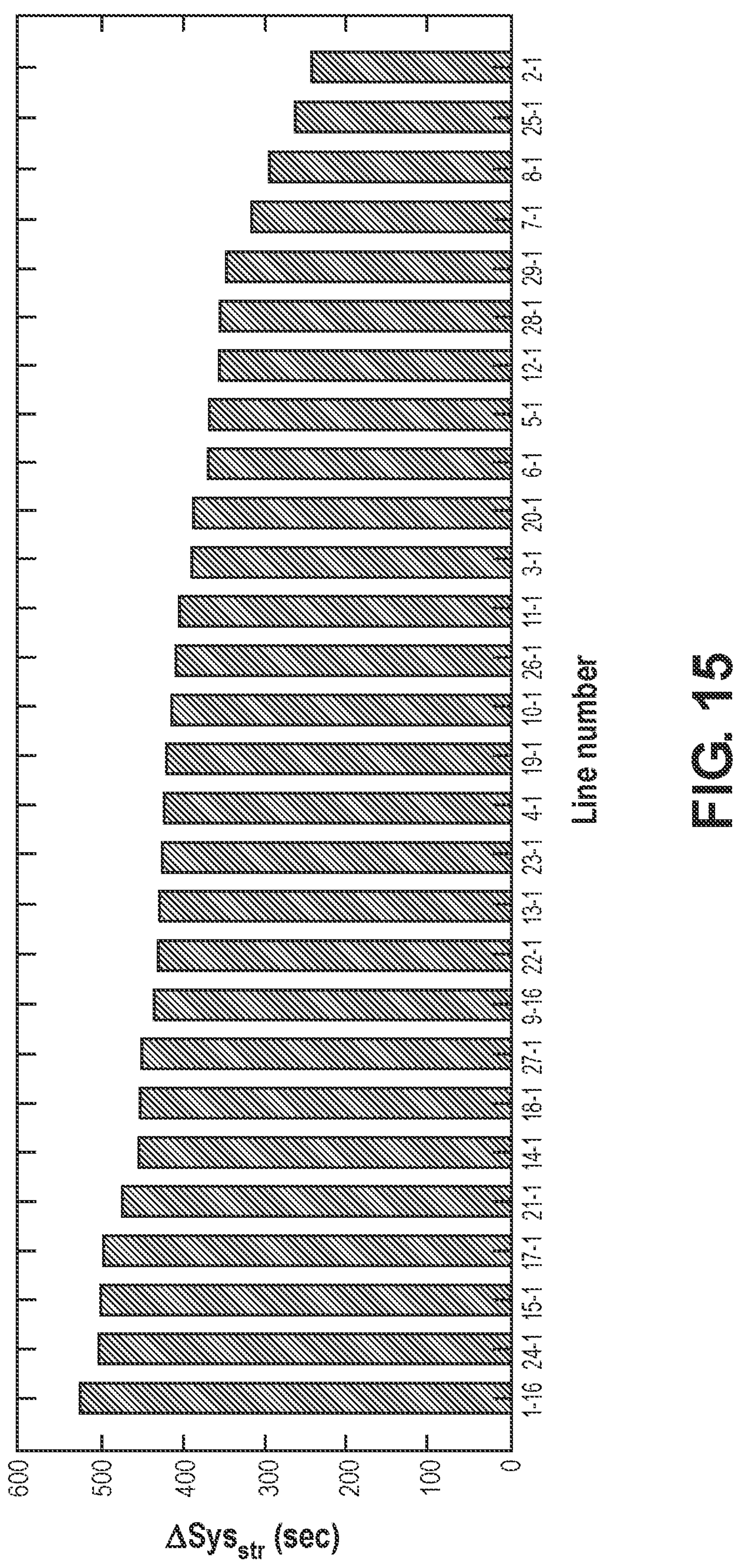
FIG. 15 is a graph of changes in system inertia due to an added line for the added lines with the largest positive impact on system inertia, according to one example of the present disclosure.

FIG. 15 is a graph of changes in system inertia due to an added line for the added lines with the largest positive impact on system inertia, according to one example of the present disclosure. Installation of an additional line can change topology of electrical networks. The effect of an additional line is investigated by connecting an additional line of constant impedance between two buses. FIG. 15 shows that a new line connected between buses 1 and 16 can achieve a maximum positive impact on system inertia.

Figure 16:
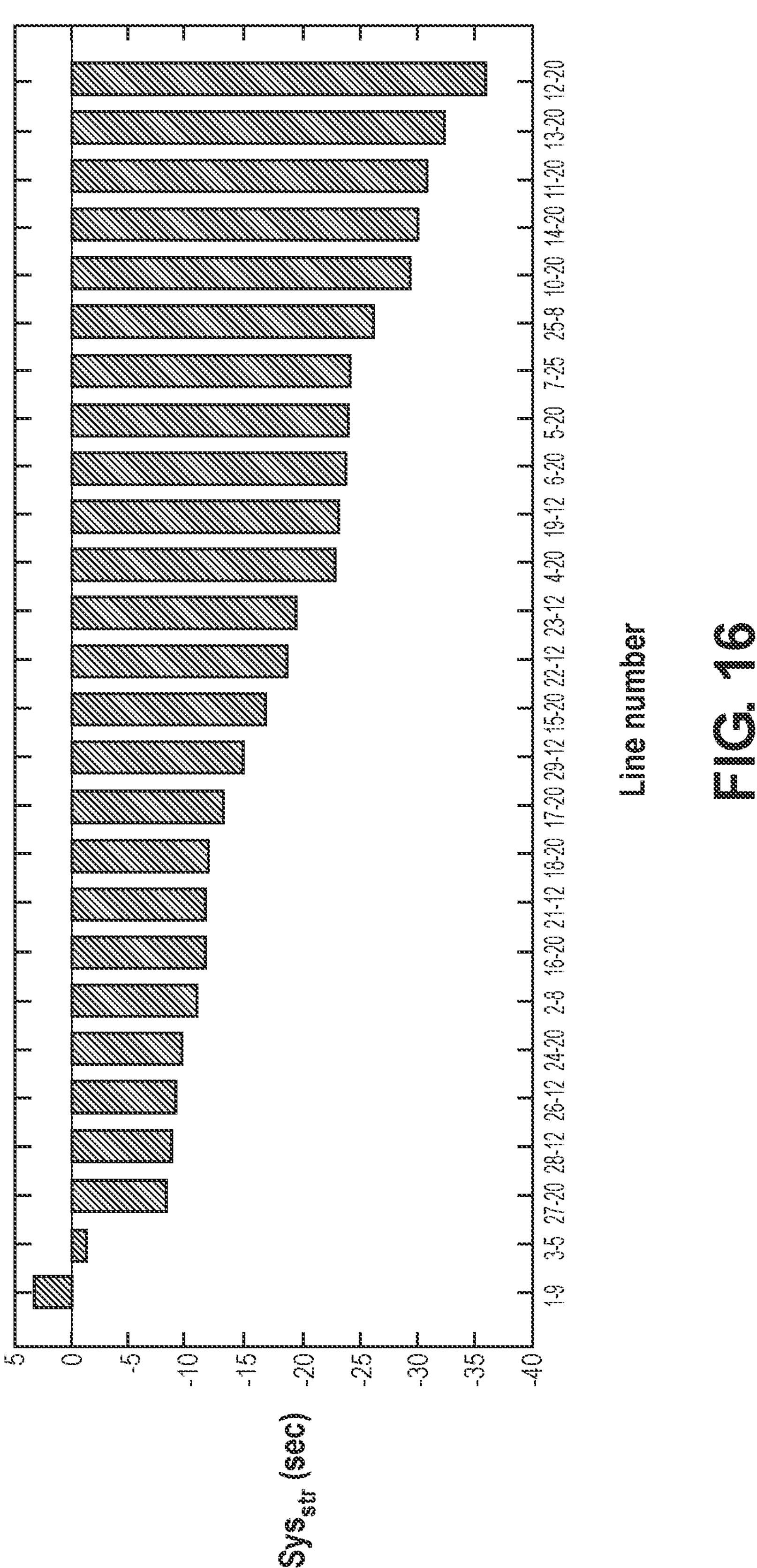
FIG. 16 is a graph of changes in system inertia due to an added line for the added lines with the largest negative impact on system inertia, according to one example of the present disclosure.

FIG. 16 is a graph of changes in system inertia due to an added line for the added lines with the largest negative impact on system inertia, according to one example of the present disclosure. Installation of an additional line can change topology of electrical networks. The effect of an additional line is investigated by connecting an additional line of constant impedance between two buses. FIG. 16 shows that a new line connected between buses 20 and 12 leads to a maximum negative impact on system inertia.

Figure 17:
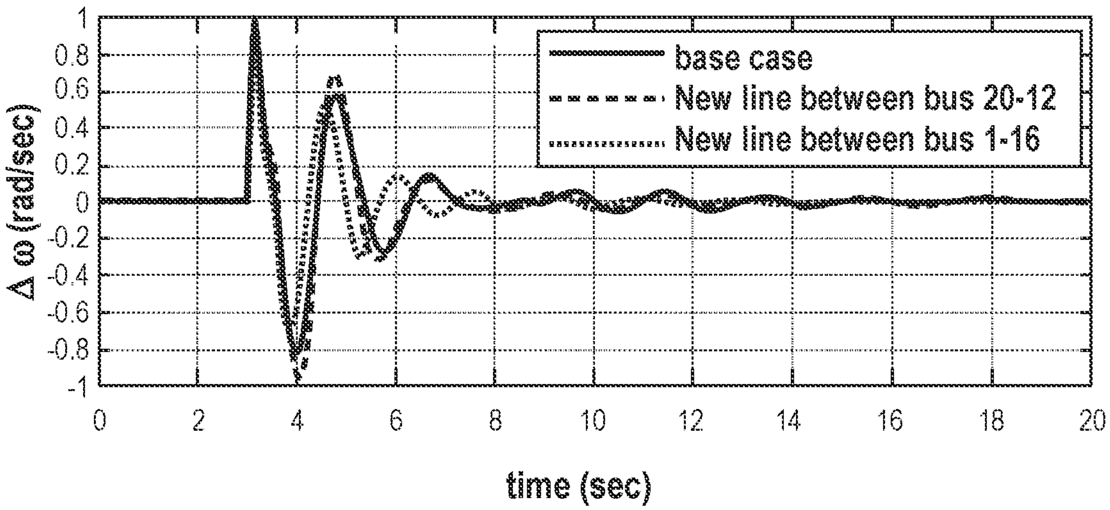
FIG. 17 is a graph depicting dynamic response of generator, $G_9$, after a three-phase to ground fault is applied at bus 14 under multiple line installation conditions, according to one example of the present disclosure.

FIG. 17 is a graph depicting dynamic response of generator, $G_9$, after a three-phase to ground fault is applied at bus 14 under multiple line installation conditions, according to one example of the present disclosure. To produce the 'base case' curve, the same three-phase to ground-fault that was described with regards to FIG. 8 is applied at bus 14. The curve labeled 'new line between bus 20-12' represents the same three-phase to ground-fault when a new line is connected between bus 20 and bus 12. The curve labeled 'new line between bus 1-16' represents the same three-phase to ground-fault when a new line is connected between bus 1 and bus 16. The line between buses 20 and 12 adversely affects system dynamics as compared to the line between buses 1 and 16.

Figure 18:
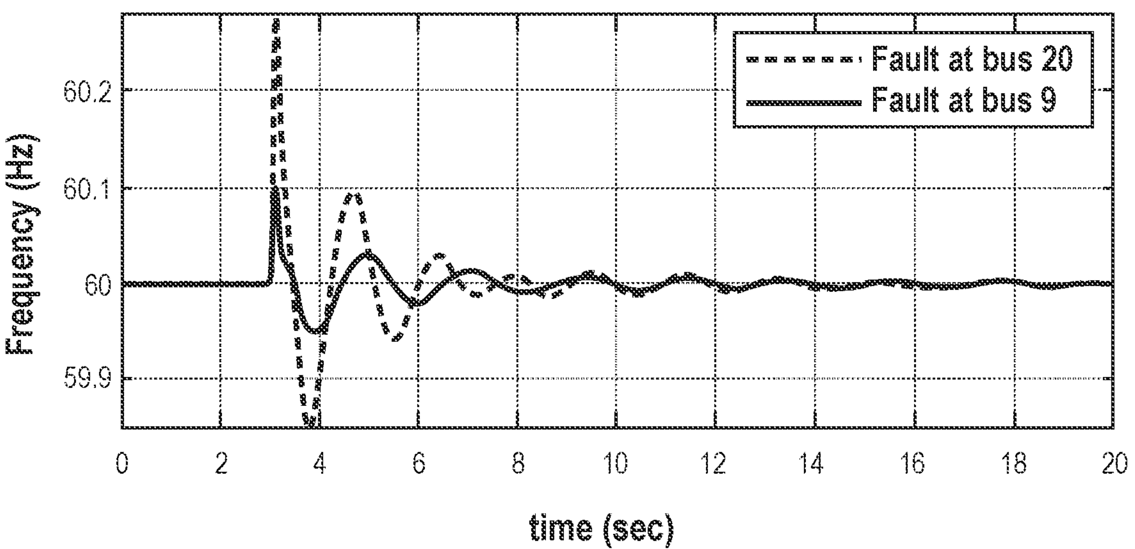
FIG. 18 is a graph of frequency versus time at bus 18 due to three-phase faults at different locations, according to one example of the present disclosure.

FIG. 18 is a graph of frequency versus time at bus 18 due to three-phase faults at different locations, according to one example of the present disclosure. Frequency impact on a particular bus depends on electrical distance of a fault point location and inertia of a faulty bus. A fault occurrence at a high inertial bus will impact other buses less than a similar fault occurrence at a low inertial bus if electrical distances are similar. For example, bus 18 is nearly equidistant to bus 9 and bus 20. To investigate an impact on frequency nadir based on inertia of buses, two separate three phase faults of 100 ms duration are initiated at buses 9 and 20, respectively. Frequency nadir can describe a minimum value of frequency reached during a transient period. FIG. 18 shows the frequency of bus 18 for each of the fault occurrences. The fault at the lower inertia bus 20 (curve labeled 'fault at bus 20') has a high impact on frequency nadir and rate of change of frequency in comparison to the fault at the higher inertia bus 9 (curve labeled 'fault at bus 9').

An optimal placement of PMUs can be essential at a planning stage for power grids. During conditions when transients are present, properly located PMUs can capture inherent fast dynamic oscillations, which can aid the bus inertia assessment method in placing WADCs. However, optimal placement of PMUs can depend on dynamic coherency of synchronous machines. Dynamic coherency of the synchronous machines occurs when all machines or buses in the same region respond similarly to a dynamic change in the system. Although some buses can have very similar inertia values, the buses may not be coherent. For example, buses 2 and 10 in the IEEE 39 bus test system have similar inertia estimates of 154.77 sec and 156.70 sec, respectively. Though the inertia estimates are quite similar, buses 2 and 10 are not coherent.

The electrical distance matrix ($Z_{dist}$) related to buses can be used in combination with the bus inertia matrix ($H_B$) to incorporate geometric connection information. An inertia attribute can influence system dynamics and a distance attribute can a closeness of coupling between different buses in the system. A combination of both attributes can aid in finding coherency groupings. A calculation of the electrical distance matrix involves a calculation of $\partial Q/\partial V$, which is a part of the Jacobian matrix. The inverse of $\partial Q/\partial V$ is called a sensitivity matrix and can reflect a propagation of voltage variation following a reactive power injection at a bus. A magnitude of voltage coupling of different buses can be measured by calculating an attenuation of voltage variation of the different buses. The attenuation can be obtained by dividing elements of each column of $\partial V/\partial Q$ by the diagonal term. An attenuation matrix can be written for any two nodes as:

$$\gamma_{ij} = \frac{\left(\frac{\partial V_i}{\partial Q_j}\right)}{\left(\frac{\partial V_j}{\partial Q_j}\right)} \quad (17)$$

where $\gamma_{ij} \neq \gamma_{ji}$. Consequently, an electrical distance between any two nodes i and j can be made symmetrical if it is expressed as:

$$Z_{distij} = Z_{distji} = -\mathrm{Log}(\gamma_{ij}\gamma_{ji}) \quad (18)$$

The normalized electrical distance matrix ($Z_{dist}$) is used in eqn. (18). The normalized distance matrix related to inertia can be computed for $H_B$ using 'pdist' and 'squareform' commands in MATLAB to find pairwise distances for inertia measures, which can provide a symmetric matrix ($n_b \times n_b$) with zeroes along the diagonal. A sum of the two normalized matrices can be used to find corrected coherency grouping.

Figure 19:
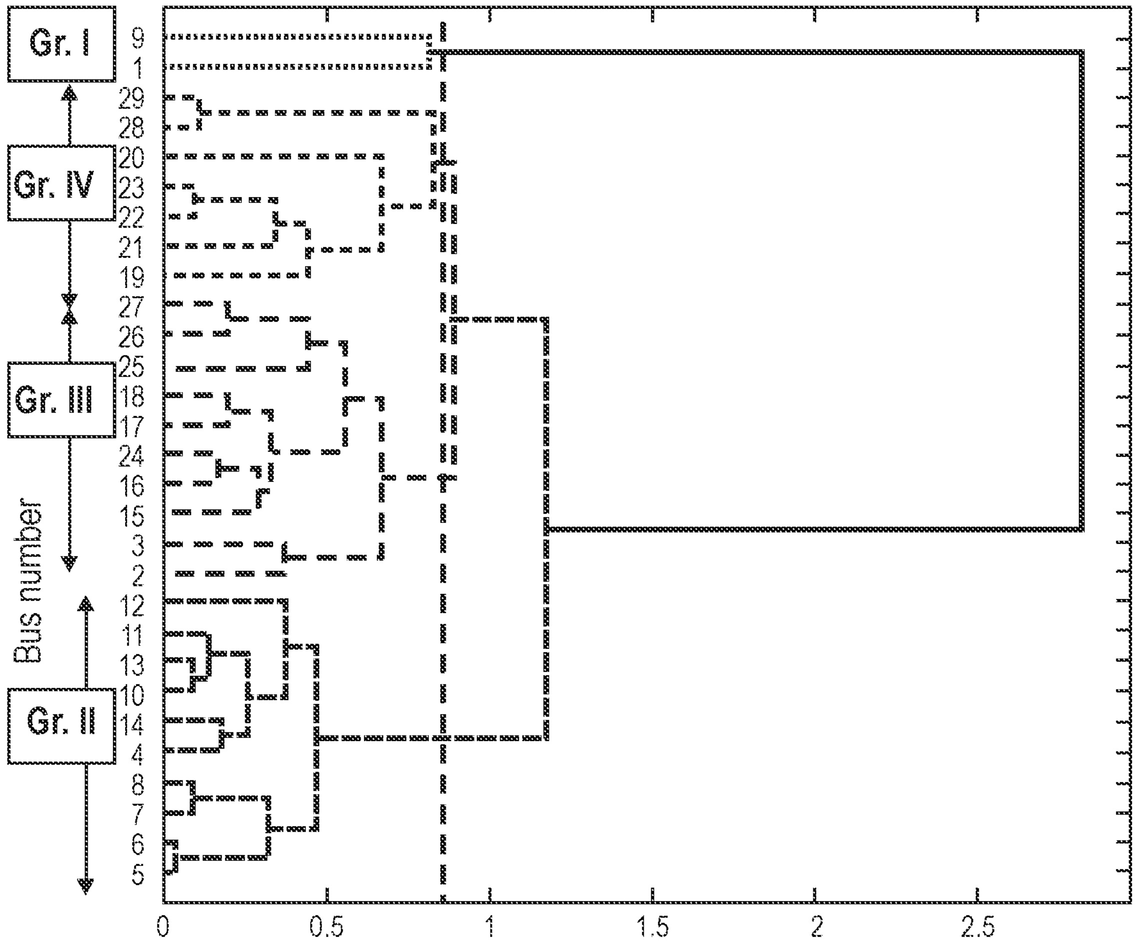
FIG. 19 is a cluster map of generators plotted via a dendrogram using Matlab, according to one example of the present disclosure.

FIG. 19 is a cluster map of generators plotted via a dendrogram using Matlab, according to one example of the present disclosure. The hierarchical clustering of buses is calculated via Euclidean distance of a coherency matrix with single-linkage criteria. Relevant distances between clusters are highlighted with different colors in the dendrogram to indicate distance value. Differing segment sizes in dashed lines of FIG. 19 define four bus groups.

Figure 20:
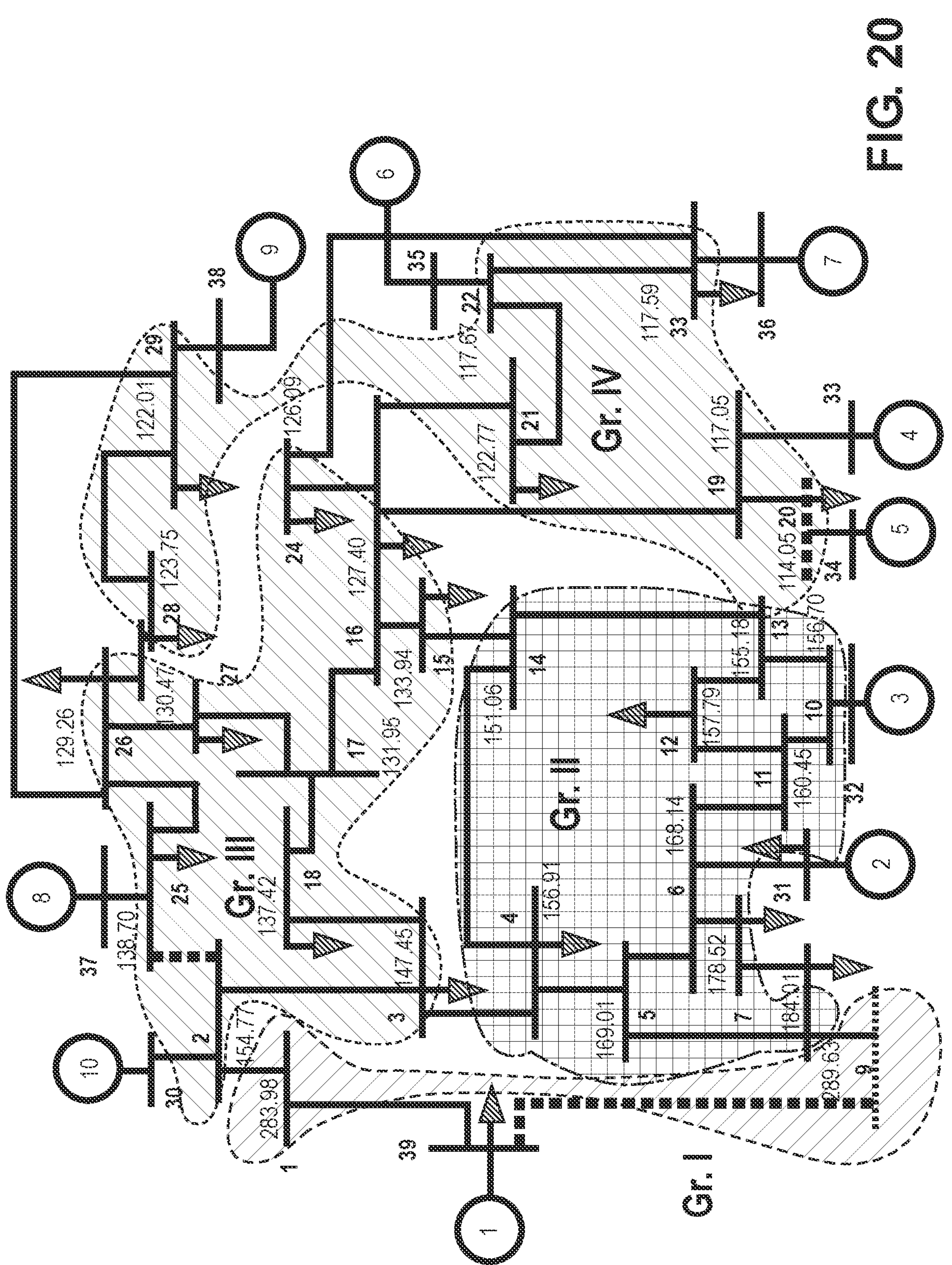
FIG. 20 is an inertia distribution map of generators and buses highlighting four connected regions, according to one example of the present disclosure.

FIG. 20 is a map of generators and buses highlighting four connected regions, according to one example of the present disclosure. The map highlights four bus groups that appeared in the hierarchical clustering of FIG. 20. All four bus groups consist of very tightly coherent buses. The ten generators are mapped based on nearby cluster centers. Four coherent generator groups are found: (1) generator 1, (2) generators 2 and 3, (3) generators 8 and 10, and (4) generators 4,5,6,7, and 9. The individual inertias of most of the buses are found close to each other in an individual bus group, with few exceptions. Based on estimated bus inertias, bus groups I and II can be identified as a strong zone. Bus group III can be identified as a medium zone. Bus group IV can be identified as a weak zone.

The identified coherency bus groups can be utilized to place four phasor measurement units (PMUs) for each bus group at a location at the most observable bus within each bus group. Observability of a bus is inversely related to inertia for the bus. Thus, the four PMUs can be placed at bus 1 for bus group I, bus 14 for bus group II, bus 24 for bus group III, and bus 20 for bus group IV.

Figure 21A:
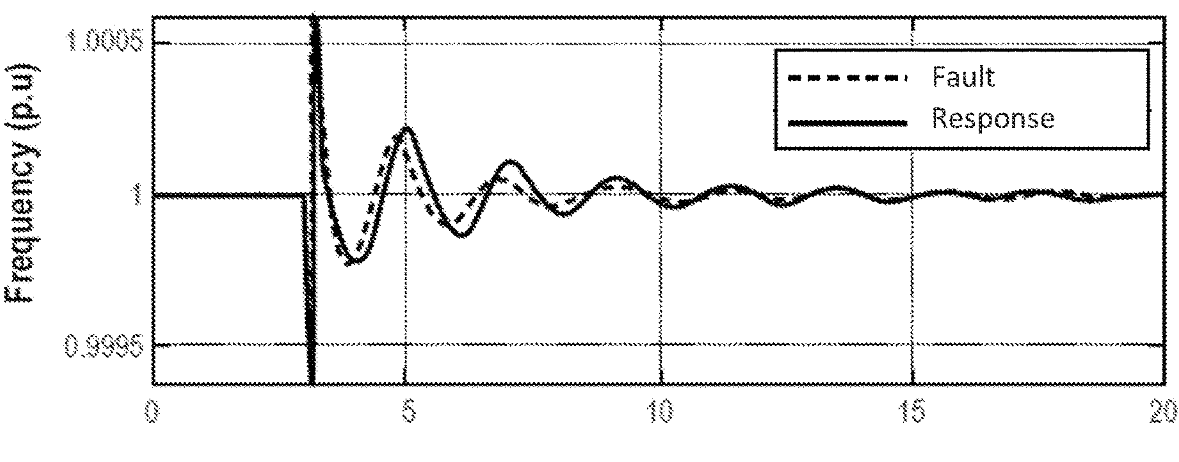
FIG. 21A is a graph of the frequency response of bus group I, according to one example of the present disclosure.
Figure 21B:
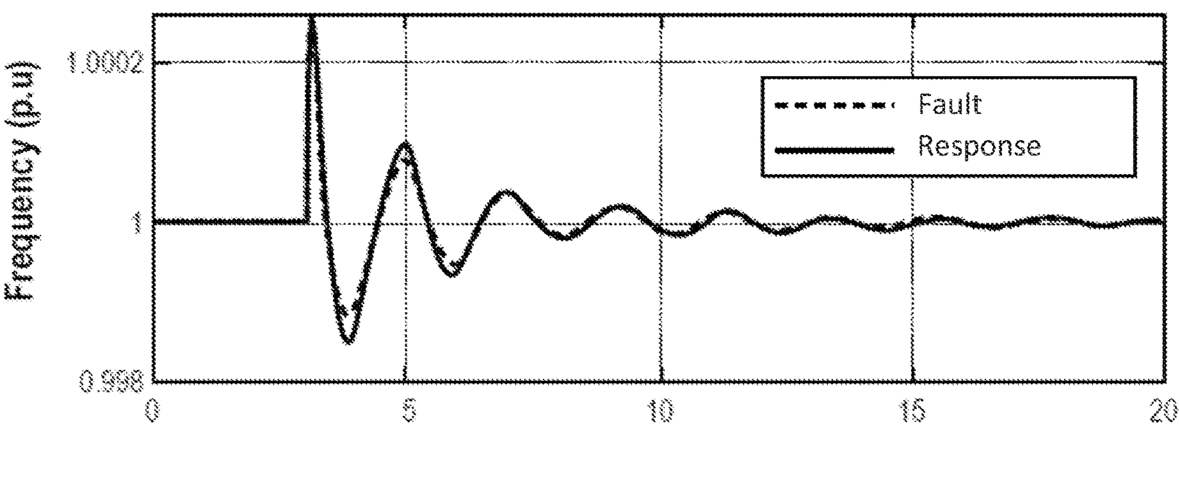
FIG. 21B is a graph of the frequency response of bus group II, according to one example of the present disclosure.
Figure 22A:
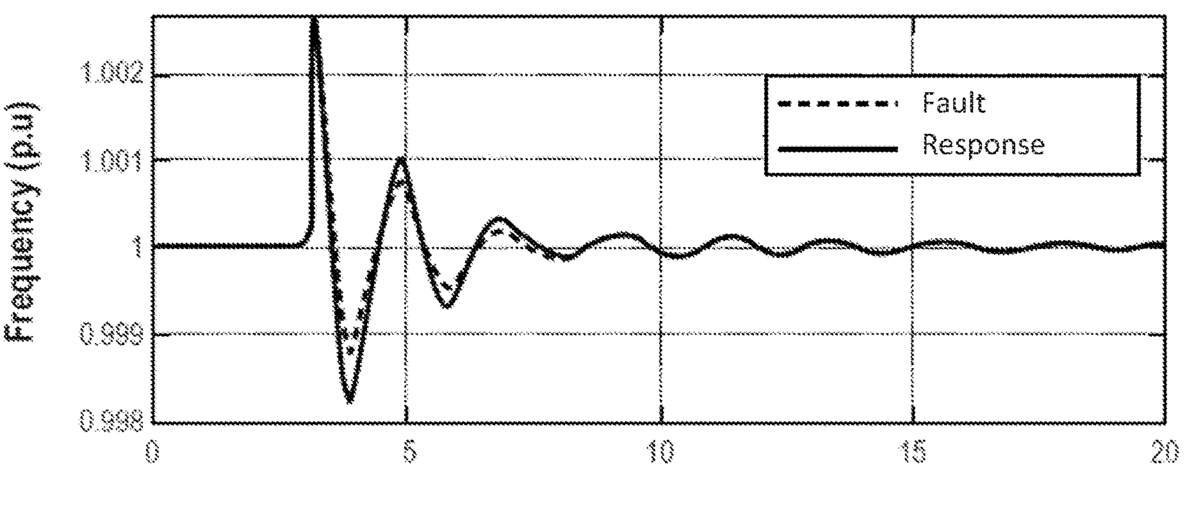
FIG. 22A is a graph of the frequency response of bus group III, according to one example of the present disclosure.
Figure 22B:
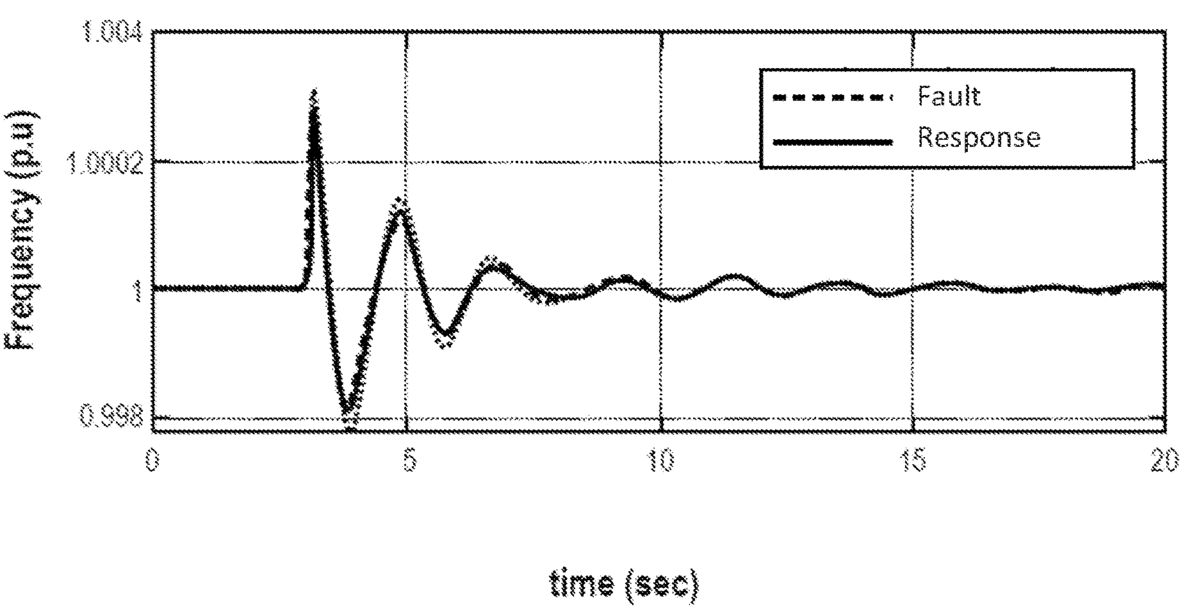
FIG. 22B is a graph of the frequency response of bus group IV, according to one example of the present disclosure.

To investigate the frequency response of the separate bus groups, a three-phase to ground fault is applied at bus 14 at a time t=3 seconds and the fault is naturally cleared after 100 ms. FIG. 21A is a graph of the frequency response of bus group I, according to one example of the present disclosure. FIG. 21B is a graph of the frequency response of bus group II, according to one example of the present disclosure. FIG. 22A is a graph of the frequency response of bus group III, according to one example of the present disclosure. FIG. 22B is a graph of the frequency response of bus group IV, according to one example of the present disclosure.

Figure 23:
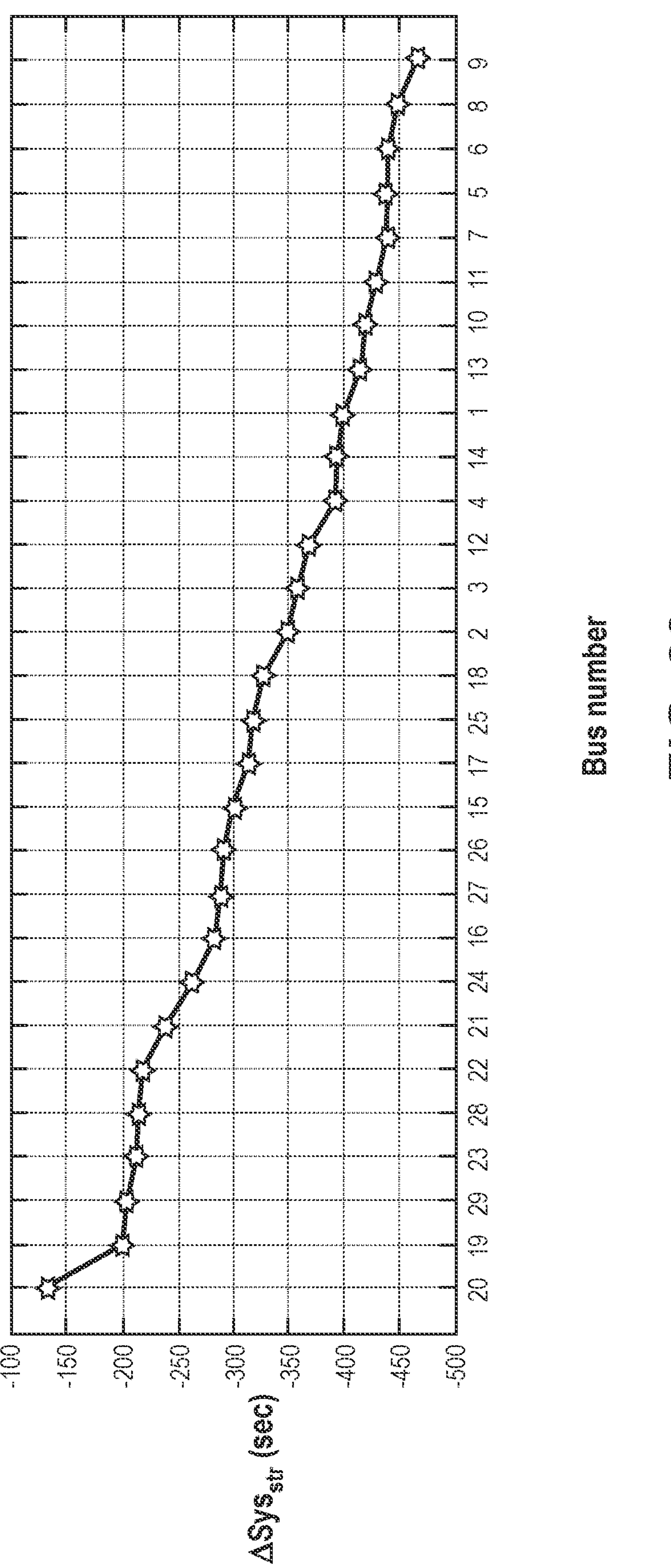
FIG. 23 is a graph of changes in system inertia due to an added 150 MW of photovoltaic (PV) power at different buses, according to one example of the present disclosure.

FIG. 23 is a graph of changes in system inertia due to an added 150 MW of photovoltaic (PV) power at different bus placement locations, according to one example of the present disclosure. The system inertia is reduced regardless of the bus placement location. But, the impact is less when the 150 MW of PV power is connected to lower inertia buses than higher inertia buses.

Figure 24:
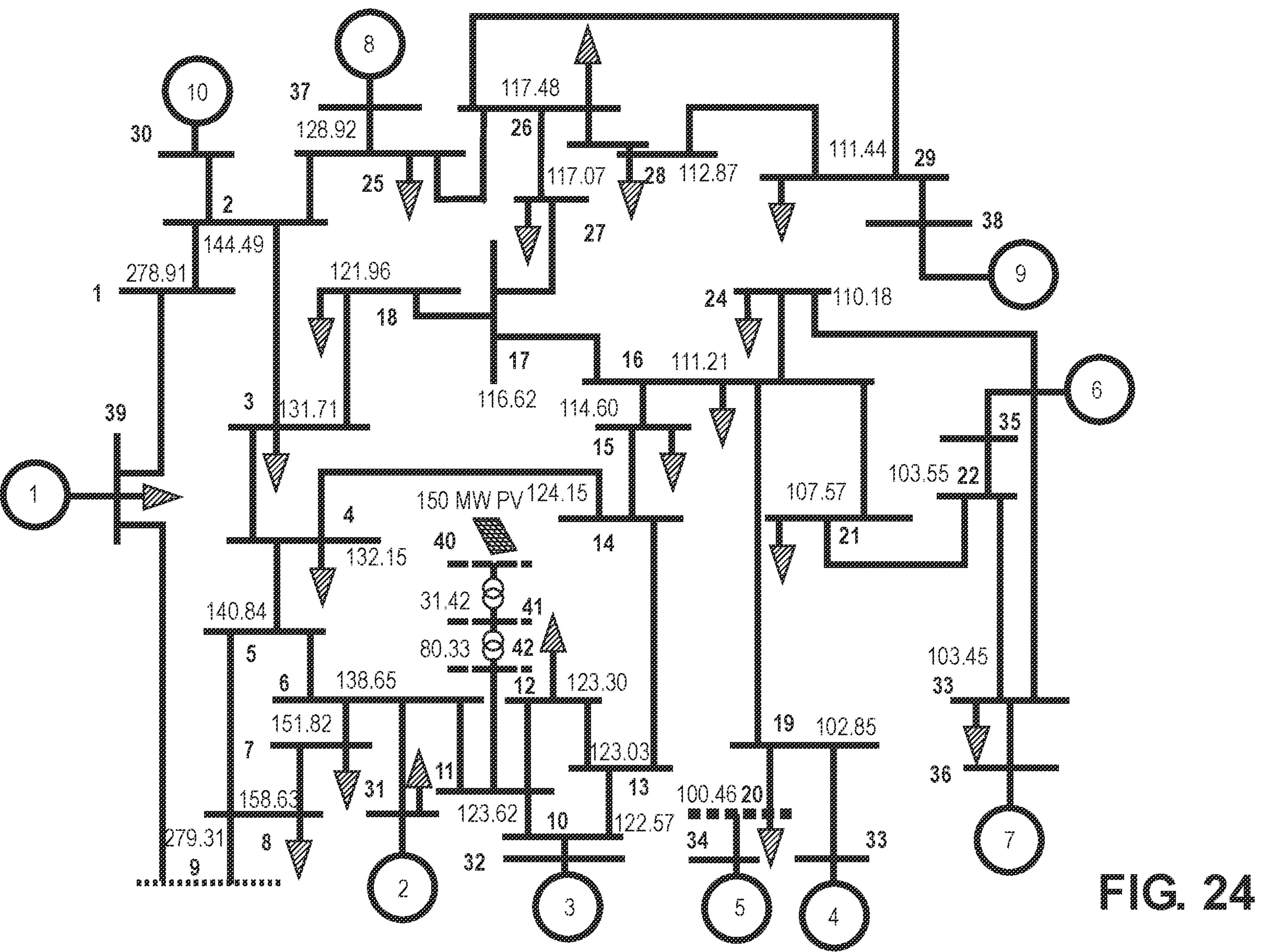
FIG. 24 is an inertia distribution map of generators and buses when 150 MW of PV power is connected to bus 11, according to one example of the present disclosure.

FIG. 24 is an inertia distribution map of generators and buses when 150 MW of PV power is connected to bus 11, according to one example of the present disclosure. The inertia of each bus is reduced by comparison to the original system (see FIG. 21.) The PV connected at bus 42 has the lowest inertia since PV does not provide additional inertia.

Figure 25:
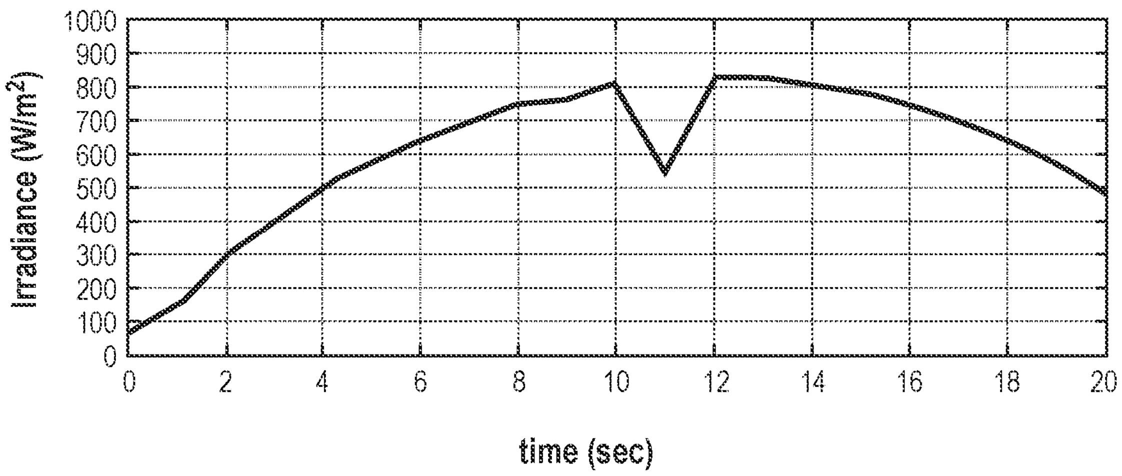
FIG. 25 is a graph of model solar irradiance for a 150 MW PV connected at bus 11, according to one example of the present disclosure.
Figure 26:
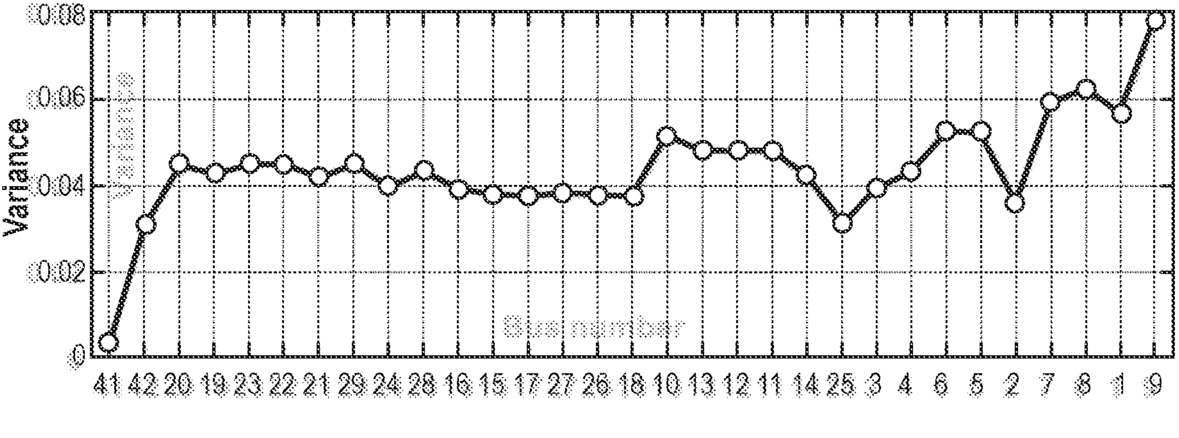
FIG. 26 is a graph of inertia variance for individual buses associated with changing irradiance of a 150 MW PV connected at bus 11, according to one example of the present disclosure.
Figure 27:
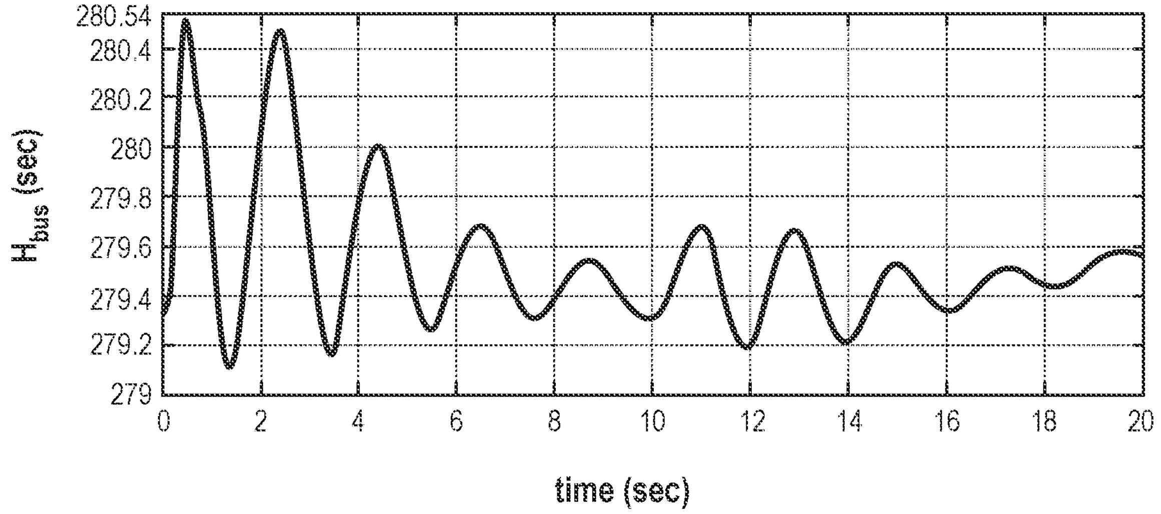
FIG. 27 shows a graph of estimated inertia of bus 9 as a function of time consistent with time dependent irradiance in a 150 MW PV connected at bus 11, according to one example of the present disclosure.

Current injections vary due to intermittent solar irradiance which can also cause changes in system inertia. FIG. 25 is a graph of model irradiance time dependence for a 150 MW PV connected at bus 11, according to one example of the present disclosure. FIG. 26 is a graph of inertia variance for individual buses associated with changing irradiance of a 150 MW PV connected at bus 11, according to one example of the present disclosure. The graph suggests that bus 9 is affected by the changing irradiance most compared to other buses, though the calculated variance is not significant. FIG. 27 shows a graph of estimated inertia of bus 9 as a function of time consistent with time dependent irradiance in a 150 MW PV connected at bus 11, according to one example of the present disclosure. A connection point for renewable energy sources can impact power grid characteristics. The bus inertia method can play a significant role in locating an optimum connection point for renewable energy sources.

Figure 28:
FIG. 28 is an illustrative architecture of a computing system implemented as some embodiments of the present disclosure.
Figure 28:
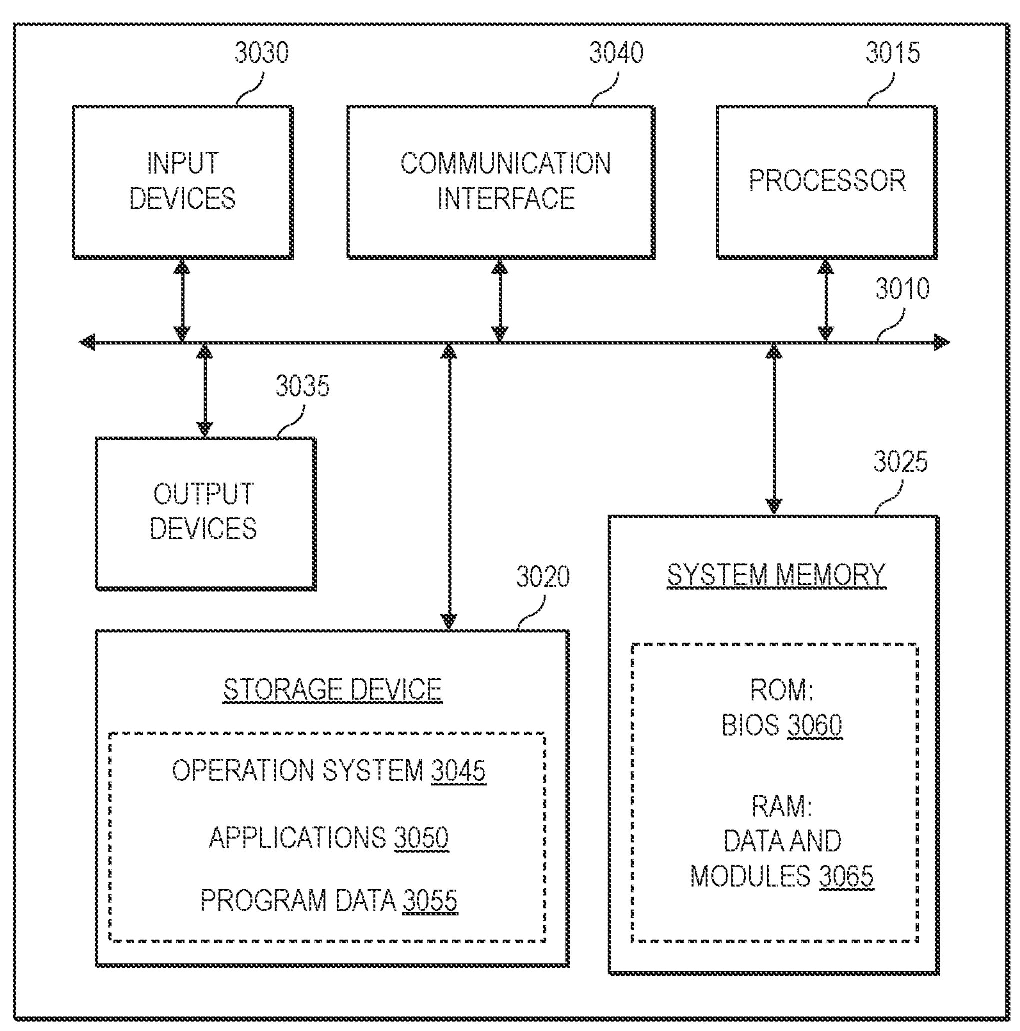

FIG. 28 is an illustrative architecture of a computing environment 3000 implemented as some embodiments of the present invention. The computing environment 3000 is only one example of a suitable computing system and is not intended to suggest any limitation as to the scope of use or functionality of the present invention. Also, computing environment 3000 should not be interpreted as having any dependency or requirement relating to any one or combination of components illustrated in computing environment 3000.

As shown in FIG. 28, computing environment 3000 includes a computer system 3005, such as the computer system 132 of FIG. 1. The computer system 3005 can be resident on a network infrastructure such as within a cloud environment or may be a separate independent computing device (e.g., a computing device of a service provider). The computer system 3005 may include a bus 3010, processor 3015, a storage device 3020, a system memory (hardware device) 3025, one or more input devices 3030, one or more output devices 3035, and a communication interface 3040.

The bus 3010 permits communication among the components of computer system 3005. For example, bus 3010 may be any of several types of bus structures including a memory bus or memory controller, a peripheral bus, and a local bus using any of a variety of bus architectures to provide one or more wired or wireless communication links or paths for transferring data and/or power to, from, or between various other components of computer system 3005.

The processor 3015 may be one or more processors, microprocessors, or specialized dedicated processors that include processing circuitry operative to interpret and execute computer readable program instructions, such as program instructions for controlling the operation and performance of one or more of the various other components of computer system 3005 for implementing the functionality, steps, and/or performance of the present invention. In certain embodiments, processor 3015 interprets and executes the processes, steps, functions, and/or operations of the present disclosure, which may be operatively implemented by the computer readable program instructions. For example, processor 3015 can receive data from synchronous machines, input the data into a real-time power grid model, generate bus inertia, and cause at least one action to be implemented based on the bus inertia. In embodiments, the information obtained or generated by the processor 3015, e.g., bus inertia, bus group coherency, etc., can be stored in the storage device 3020.

The storage device 3020 may include removable/non-removable, volatile/non-volatile computer readable media, such as, but not limited to, non-transitory machine readable storage medium such as magnetic and/or optical recording media and their corresponding drives. The drives and their associated computer readable media provide for storage of computer readable program instructions, data structures, program modules and other data for operation of computer system 3005 in accordance with the different aspects of the present invention. In embodiments, storage device 3020 may store operating system 3045, application programs 3050, and program data 3055 in accordance with aspects of the present invention.

The system memory 3025 may include one or more storage mediums, including for example, non-transitory machine readable storage medium such as flash memory, permanent memory such as read-only memory ("ROM"), semi-permanent memory such as random access memory ("RAM"), any other suitable type of non-transitory storage component, or any combination thereof. In some embodiments, an input/output system 3060 (BIOS) including the basic routines that help to transfer information between the various other components of computer system 3005, such as during start-up, may be stored in the ROM. Additionally, data and/or program modules 3065, such as at least a portion of operating system 3045, program modules, application programs 3050, and/or program data 3055, that are accessible to and/or presently being operated on by processor 3015, may be contained in the RAM. In embodiments, the program modules 3065 and/or application programs 3050 can comprise, for example, a processing tool to identify optimal locations to place PMUs, etc.

The one or more input devices 3030 may include one or more mechanisms that permit an operator to input information to computer system 3005, including, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 3035 may include one or more mechanisms that output information to an operator, such as, but not limited to, audio speakers, headphones, audio line-outs, visual displays, antennas, infrared ports, tactile feedback, printers, or combinations thereof.

The communication interface 3040 may include any transceiver-like mechanism (e.g., a network interface, a network adapter, a modem, or combinations thereof) that enables computer system 3005 to communicate with remote devices or systems, such as a mobile device or other computing devices such as, for example, a server in a networked environment, e.g., cloud environment. For example, computer system 3005 may be connected to remote devices or systems via one or more local area networks (LAN) and/or one or more wide area networks (WAN) using communication interface 3040.

As discussed herein, computing environment 3000 may be configured to model bus inertia using a real-time power grid model that includes non-linear algorithms. In particular, computer system 3005 may perform tasks (e.g., process, steps, methods and/or functionality) in response to processor 3015 executing program instructions contained in non-transitory machine readable storage medium, such as a system memory 3025. The program instructions may be read into system memory 3025 from another computer readable medium (e.g., non-transitory machine readable storage medium), such as data storage device 3020, or from another device via the communication interface 3040 or server within or outside of a cloud environment. In embodiments, an operator may interact with computer system 3005 via the one or more input devices 3030 and/or the one or more output devices 3035 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific computational models, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method implemented on a computer system, the method comprising:

receiving data from a plurality of synchronous machines and phasor measurement units (PMUs) located in different geographic regions of a power grid, the data including an augmented admittance matrix;

inputting the data into a real-time power grid model comprising non-linear algorithms;

determining an output of the real-time power grid model, the output comprising bus inertia indicating a distribution of total inertia across a plurality of buses located in the different geographic regions of the power grid, wherein inertia for a bus indicating a capability of the bus to resist changes when a disturbance occurs, and wherein the bus inertia is determined based on a bus weightage matrix that indicates measurements of electrical distances between buses and physical generator inertia; and causing at least one action to be implemented based on the bus inertia.

2. The method of claim 1, wherein the at least one action comprises categorizing zones of the power grid according to strength.

3. The method of claim 1, wherein the data further comprises a bus voltage, a line parameter, an inertia constant, or an internal voltage setpoint.

4. The method of claim 1, wherein the at least one action comprises determining a location to place a wide-area damping controller (WADC) comprising a system of components that mitigate oscillations of frequency.

5. The method of claim 1, wherein the at least one action comprises determining a location to place a plurality of renewable energy sources (RES) for integration into the power grid.

6. The method of claim 1, wherein the at least one action comprises determining at least one recommendation for planning a network upgrade.

7. The method of claim 6, wherein the recommendation includes at least one of load shifting, topological changes, or high voltage, direct current (HVDC) inter-connections.

8. A computer system comprising:

one or more data processors; and one or more memory devices storing computer-readable instructions that, upon execution by the one or more data processors, configure the computer system to:

receive data from a plurality of synchronous machines and phasor measurement units (PMUs) located in different geographic regions of a power grid, the data including an augmented admittance matrix;

input the data into a real-time power grid model comprising non-linear algorithms;

determine an output of the real-time power grid model, the output comprising bus inertia indicating a distribution of total inertia across a plurality of buses located in the different geographic regions of the power grid, wherein inertia for a bus indicating a capability of the bus to resist changes when a disturbance occurs, and wherein the bus inertia is determined based on a bus weightage matrix that indicates measurements of electrical distances between buses and physical generator inertia; and cause at least one action to be implemented based on the bus inertia.

9. The computer system of claim 8, wherein the at least one action comprises calculating network sensitivity to changes in loading conditions.

10. The computer system of claim 8, wherein the data is received in real-time, and wherein the data is input into the real-time power grid model in real-time.

11. The computer system of claim 8, wherein the at least one action comprises identifying coherency grouping for the plurality of buses.

12. The computer system of claim 8, wherein the at least one action comprises defining vulnerable zones for an inter-connection of renewable energy sources (RES).

13. The computer system of claim 8, wherein the at least one action comprises determining a location to place a plurality of RES for integration into the power grid.

14. The computer system of claim 8, wherein the at least one action comprises selecting a control action in response to a disturbance in the power grid.

15. A non-transitory computer readable storage medium, storing instructions that upon execution by one or more data processors of a computer system, configure the computer system to:

receive data from a plurality of synchronous machines and phasor measurement units (PMUs) located in different geographic regions of a power grid, the data including an augmented admittance matrix;

input the data into a real-time power grid model comprising non-linear algorithms;

determine an output of the real-time power grid model, the output comprising bus inertia indicating a distribution of total inertia across a plurality of buses located in the different geographic regions of the power grid, wherein inertia for a bus indicating a capability of the bus to resist changes when a disturbance occurs, and wherein the bus inertia is determined based on a bus weightage matrix that indicates measurements of electrical distances between buses and physical generator inertia; and cause at least one action to be implemented based on the bus inertia.

16. The non-transitory computer readable storage medium of claim 15, wherein the at least one action comprises categorizing zones of the power grid according to strength.

17. The non-transitory computer readable storage medium of claim 15, wherein at least two synchronous machines of the plurality of synchronous machines are associated with different types of dynamic models.

18. The non-transitory computer readable storage medium of claim 15, wherein the at least one action comprises determining a location to place a wide-area damping controller (WADC) comprising a system of components that mitigate oscillations of frequency.

19. The non-transitory computer readable storage medium of claim 15, wherein the at least one action comprises determining a location to place a plurality of renewable energy sources (RES) for integration into the power grid.

20. The non-transitory computer readable storage medium of claim 15, wherein the at least one action comprises calculating network sensitivity to changes in loading conditions.

* * * * *